US010274384B2

(12) United States Patent
Dunne et al.

(10) Patent No.: US 10,274,384 B2
(45) Date of Patent: Apr. 30, 2019

(54) STITCHED STRETCH SENSOR

(71) Applicant: Regents of the University of Minnesota, Minneapolis, MN (US)

(72) Inventors: Lucy E. Dunne, Minneapolis, MN (US); Guido Gioberto, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/888,562

(22) Filed: Feb. 5, 2018

(65) Prior Publication Data

US 2018/0172526 A1    Jun. 21, 2018

Related U.S. Application Data

(63) Continuation of application No. 15/137,736, filed on Apr. 25, 2016, now Pat. No. 9,885,621, which is a continuation of application No. 14/193,892, filed on Feb. 28, 2014, now Pat. No. 9,322,121.

(60) Provisional application No. 61/932,163, filed on Jan. 27, 2014, provisional application No. 61/770,583, filed on Feb. 28, 2013.

(51) Int. Cl.
| D05B 93/00 | (2006.01) |
| G01L 1/22 | (2006.01) |
| D05B 97/12 | (2006.01) |
| G01L 1/20 | (2006.01) |
| G01B 7/16 | (2006.01) |
| D05B 97/08 | (2006.01) |

(52) U.S. Cl.
CPC ............ *G01L 1/2287* (2013.01); *D05B 93/00* (2013.01); *D05B 97/08* (2013.01); *D05B 97/12* (2013.01); *G01B 7/18* (2013.01); *G01L 1/205* (2013.01)

(58) Field of Classification Search
None
See application file for complete search history.

(56) References Cited

U.S. PATENT DOCUMENTS

| 4,715,235 A | 12/1987 | Fukui |
| 5,746,145 A | 5/1998 | Cox et al. |
| 7,365,031 B2 | 4/2008 | Swallow et al. |

(Continued)

FOREIGN PATENT DOCUMENTS

| CN | 1882280 B | 12/2006 |
| EP | 0206450 B1 | 11/1990 |

(Continued)

OTHER PUBLICATIONS

Prosecution History from U.S. Appl. No. 15/137,736, dated Aug. 25, 2016 through Nov. 27, 2017, 55 pp.

(Continued)

*Primary Examiner* — Peter J Macchiarolo
*Assistant Examiner* — Jermaine L Jenkins
(74) *Attorney, Agent, or Firm* — Shumaker & Sieffert, P.A.

(57) ABSTRACT

A stitched sensor including a plurality of threads stitched to a textile in a stitch geometry is described. The plurality of threads includes a conductive thread, and the stitch geometry is configured such that an electrical property of the stitched sensor changes based on at least one of stretching, relaxation, or bending of the textile. Methods for forming a stitched sensor are also described.

21 Claims, 23 Drawing Sheets

(56) References Cited

U.S. PATENT DOCUMENTS

| | | | |
|---|---|---|---|
| 7,544,627 | B2 | 6/2009 | Tao et al. |
| 7,712,373 | B2 | 5/2010 | Nagle et al. |
| 7,849,888 | B2 | 12/2010 | Karayianni et al. |
| 8,034,001 | B2 | 10/2011 | Gal |
| 8,272,069 | B2 | 9/2012 | Hyde et al. |
| 8,966,942 | B2 * | 3/2015 | Dias .................. D04B 1/14 66/170 |
| 9,048,013 | B2 | 6/2015 | Tang et al. |
| 9,322,121 | B2 | 4/2016 | Dunne et al. |
| 9,733,136 | B2 * | 8/2017 | Seitz .................. G01D 5/2417 |
| 9,885,621 | B2 | 2/2018 | Dunne et al. |
| 2002/0076948 | A1 | 6/2002 | Farrell et al. |
| 2002/0121146 | A1 | 9/2002 | Manaresi et al. |
| 2003/0056599 | A1 | 3/2003 | Van Schoor |
| 2005/0054941 | A1 | 3/2005 | Ting et al. |
| 2007/0089800 | A1 | 4/2007 | Sharma |
| 2008/0050550 | A1 | 2/2008 | Orth |
| 2008/0091097 | A1 | 4/2008 | Linti et al. |
| 2010/0199901 | A1 | 8/2010 | Kang et al. |
| 2012/0323501 | A1 * | 12/2012 | Sarrafzadeh .......... G01L 1/18 702/41 |
| 2013/0152272 | A1 | 6/2013 | Schultz |
| 2014/0238151 | A1 | 8/2014 | Dunne et al. |
| 2015/0164420 | A1 | 6/2015 | Huang et al. |
| 2015/0168238 | A1 | 6/2015 | Raut et al. |
| 2015/0199045 | A1 | 7/2015 | Robucci et al. |
| 2015/0370320 | A1 | 12/2015 | Connor |

FOREIGN PATENT DOCUMENTS

| | | |
|---|---|---|
| WO | 02076948 A1 | 10/2002 |
| WO | 2004100784 A2 | 11/2004 |
| WO | 2005013652 A1 | 2/2005 |
| WO | 2010045242 A2 | 4/2010 |
| WO | 2013188908 A1 | 12/2013 |

OTHER PUBLICATIONS

"A Library of Textile Sensors: Capturing Movement and Touch with Fabric," MIT website, retrieved from the internet at http://web.media.mit.edu/~plusea/downloads/papers/UIST-SensorLibrarySubmitted.pdf, last accessed Nov. 2, 2012, 9 pp.

"Integrated Embroidered Sensor," FiberCheck, retrieved from the internet http://www.fibercheck.de/fileadmin/user_upload/pdf/datenblatt_sticksensor_X3.pdf, last accessed Nov. 2, 2012, 2 pp.

"Lamé Lifesaver—Conductive Thread for Everything!," retrieved from the internet http://members.shaw.ca/ubik/thread/order.html, last accessed Nov. 2, 2012, 2 pp.

"Vista-Medical—Stretch FSA Sensors," Vista Medical, retrieved from the internet http://vista-medical.com/subsite/stretch.php, last accessed Nov. 2, 2012, 2 pp.

Alici et al., "Response Characterization of Electroactive Polymers as Mechanical Sensors," Mechantronics, IEEE/ASME Transactions on, vol. 13, No. 2, Apr. 2008, pp. 187-196.

Bickerton, "Effects of Fibre Interactions on Conductivity, within a Knitted Fabric Stretch Sensor," The Institution of Electrical Engineers, Sep. 2003, 8 pp.

Blazevic et al., "New Tendencies of Wearable Electronics Application in Smart Clothing," Electronika IR Electrotechnika, vol. 73, No. 1, Jan. 2007, 4 pp.

Catrysse et al., "Fabric Sensors for the Measurement of Physiological Parameters," in Proceedings of the 12th International Conference on Transducers, Solid-Slate Sensors, Actuators and Microsystems, vol. 2, Jun. 8-12, 2003, pp. 1758-1761.

Costa et al., "Ambulatory Blood Pressure Monitoring is Associated with Reduced Physical Activity During Everyday Life," Psychosomatic Medicine, vol. 61, No. 6, Nov. 1999, pp. 806-811.

De Rossi et al., "Electroactive Fabrics and Wearable Biomonitoring Devices," AUTEX Research Journal, vol. 3, No. 4, Dec. 2003, 6 pp.

Dunne et al., "Initial Development and Testing of a Novel Foam-Based Pressure Sensor for Wearable Sensing," Journal of Neuroengineering and Rehabilitation, vol. 2, Mar. 1, 2005, 7 pp.

Dunne et al., "Psychophysical Elements of Wearability," in Proceedings of the ACM SIGCHI Conference on Human Factors in Computing Systems, Apr. 28-May 3, 2007, pp. 299-302.

Dunne, "Smart Clothing in Practice: Key Design Barriers to Commercialization," Fashion Practice: The Journal of Design, Creative Process & the Fashion Industry, vol. 2, No. 1, May 2010, pp. 41-66.

Dunne, "Wearable Technology, E-Textiles, and Design," Lecture by Lucy Dunne at the Handweaver's Guild of America Annual Conference, Jul. 19, 2012, 38 pp.

Elsner, "Textile Technological Integration of Sensor Modules in Lightweight Composite Structures and Possible Applications," Newsletter of ECAS e. V., Activities in Adaptronics, Feb. 2010, 3 pp.

Farringdon et al, "Wearable Sensor Badge & Sensor Jacket for Context Awareness," in Proceedings of the Third International Symposium on Wearable Computers, Oct. 1999, pp. 107-113.

Fraunhofer-Gesellschaft, "Sensors that Can Stretch," Fraunhofer, retrieved from the internet http://www.alphagalileo.orgNiewItem.aspx?ItemId=102986&CultureCode=en, May 11, 2011, 6 pp.

Gioberto et al., "Theory and Characterization of a Top-Thread Coverstitched Stretch Sensor," Proceedings of the IEEE Conference on Systems, Man, and Cybernetics, Oct. 14-17, 2012, 6 pp.

Gioberto, "Stretch Detection Using 'Invisible' Sensors," University of Minnesota, College of Design, Wearable Technology Lab, 2012, 1 pp. (Note: Applicant points out in accordance with MPEP 609.04(a) that the 2012 year of publication is sufficiently earlier than the effective U.S. filing dated and any foreign priority dale of Feb. 28, 2013 so that the particular month of publication is not in issue.)

Guo et al., "Textile Strain Sensors Characterization—Sensitivity, Linearity, Stability and Hysteresis," Nordic Textile Journal, Feb. 2010, 10 pp.

Guo et al.. "'Disappearing Sensor'—Textile Based Sensor for Monitoring Breathing," in Proceedings of the International Conference on Control, Automation and Systems Engineering, Jul. 30-31, 2011, 4 pp.

Guo, "Test and Evaluation of Textile Based Stretch Sensors," AUTEX 2009 World Textile Conference, May 26-28, 2009, 8 pp.

Linz et al., "Embroidering Electrical Interconnects with Conductive Yarn for the Integration of Flexible Electronic Modules into Fabric," in Proceedings of the Ninth IEEE International Symposium on Wearable Computers, Oct. 18-21, 2005, pp. 86-89.

Mattmann et al., "Recognizing Upper Body Postures Using Textile Strain Sensors," 11th IEEE International Symposium on Wearable Computers, Oct. 11-13, 2007, pp. 29-36.

Perner-Wilson et al., "DIY Wearable Technology," ISEA 2009 Wearable Materialities Panel, Nov. 2009, 6 pp.

Perner-Wilson et al.. "Handcrafting Textile Interfaces from a Kit-of-No-Parts," Proceedings of the Fifth International Conference on Tangible, Embedded, and Embodied Interaction, TEI '11, Jan. 2011, 7 pp.

Prosecution History from U.S. Appl. No. 14/193,892, dated Apr. 9, 2014 through Feb. 22, 2016, 56 pp.

Qureshi et al., "Knitted Wearable Stretch Sensor for Breathing Monitoring Application," Ambience'11, Nov. 2011, 5pp.

Rovira et al., "Integration of Textile-based Sensors and Shimmer for Breathing Rate and Volume Measurement," in Proceedings of the 5th International Conference on Pervasive Computing Technologies for Healthcare, May 23-26, 2011, pp. 238-241.

Soleimani, "Electromechanical Properties of Wearable Strain Gauge Transducers," Electronics Letters, vol. 44, No. 21, Oct. 9, 2008, pp. 1236-1238.

Wijesiriwardana et al., "Resistive Fibre-Meshed Transducers," in Proceedings of the 7th IEEE International Symposium on Wearable Computers, Washington, DC, Oct. 2003, 10 pp.

Wijesiriwardana, "Fibre-meshed Transducers Based Real Time Wearable Physiological Information Monitoring System," ISWC Eighth International Symposium on Wearable Computers, Oct. 31-Nov. 3, 2004, pp. 40-47.

"Stitch Guide," accessed from Sewingcontract.com, Dewellton LLC, Oct. 17, 2007, 8 pp.

(56) References Cited

OTHER PUBLICATIONS

Brady et al., "Garment-based Monitoring of Respiration Rate Using a Foam Pressure Sensor," in Proceedings of the IEEE International Symposium on Wearable Computers, Oct. 2005, 2 pp.

* cited by examiner

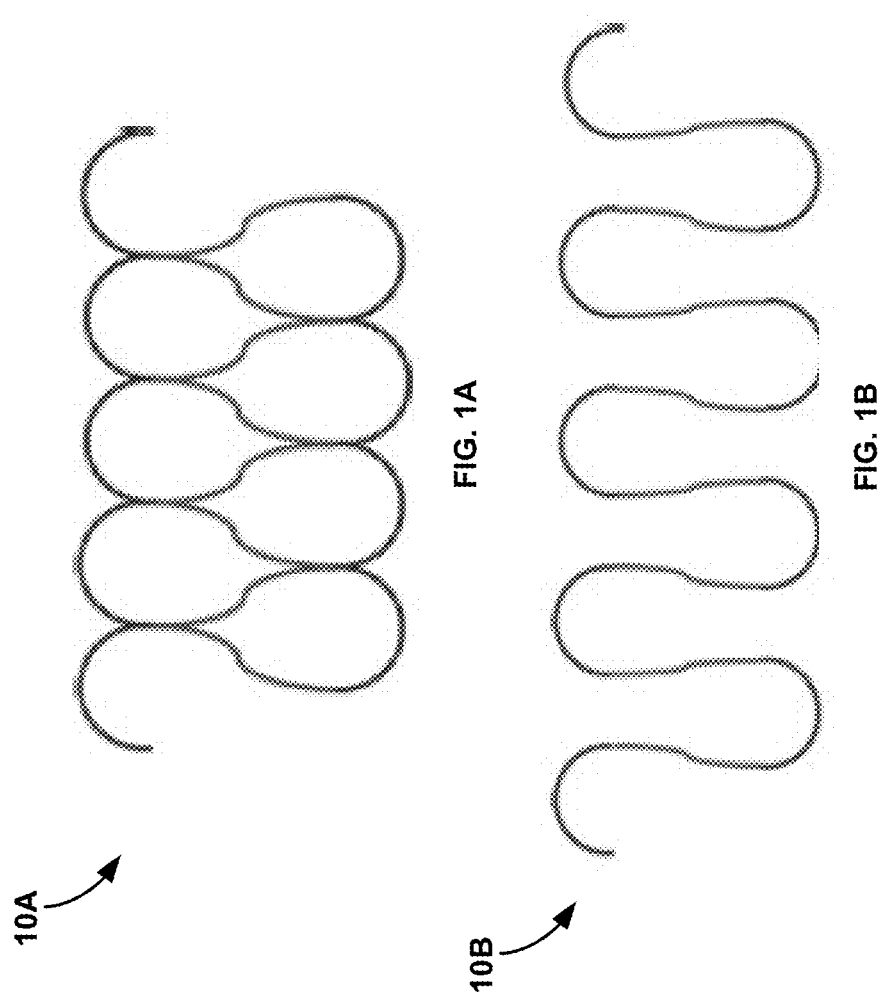

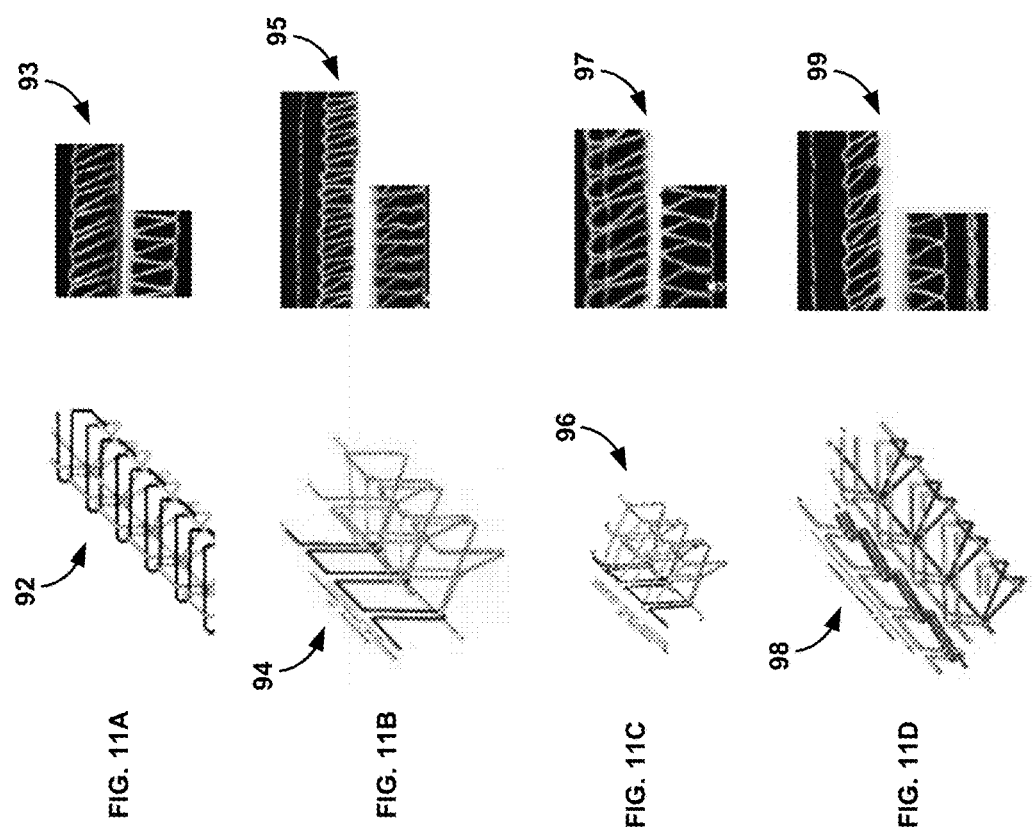

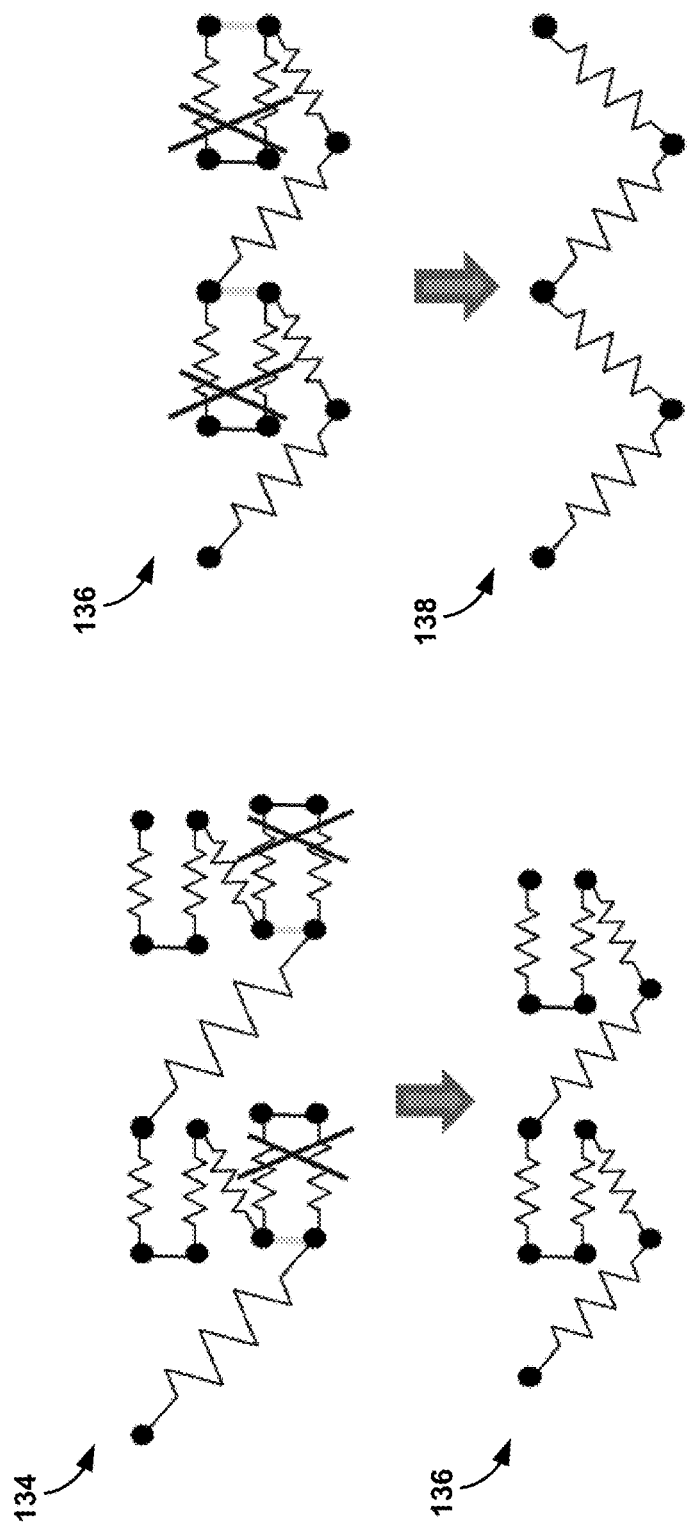

STITCHED STRETCH SENSOR

This application is a continuation of U.S. patent application Ser. No. 15/137,736, filed on Apr. 25, 2016 and entitled "STITCHED STRETCH SENSOR," which is a continuation of U.S. patent application Ser. No. 14/193,892, filed on Feb. 28, 2014 and entitled "STITCHED STRETCH SENSOR," which claims the benefit of U.S. Provisional Application No. 61/932,163, filed on Jan. 27, 2014 and entitled "STITCHED STRETCH SENSOR," and U.S. Provisional Application No. 61/770,583, filed on Feb. 28, 2013 and entitled "STITCHED STRETCH SENSOR." The entire contents of U.S. application Ser. Nos. 15/137,736, 14/193,892, 61/932,163, and 61/770,583 are incorporated herein by reference.

GOVERNMENT RIGHTS

This invention was made with government support under NSF Grant No. IIS-1116719 awarded by the National Science Foundation. The government has certain rights in this invention.

TECHNICAL FIELD

The disclosure relates to stitched sensors for textiles.

BACKGROUND

A challenge of wearable sensing is adapting electronic components and sensors to the wearable environment. Electronic components are often rigid, bulky, and impermeable: factors that usually detract from wearing comfort. Sensing the body effectively may require both sufficient accuracy and precision of the sensor to render useful information and sufficient comfort of the user to render willingness to use or wear the device. In non-critical sensing activities (such as those peripheral, context-aware applications often seen in pervasive computing), this tradeoff is all the more difficult to navigate because compromise in user comfort becomes increasingly unrealistic. As such, traditional sensing techniques may rely on components and approaches developed for sensing outside of the wearable environment.

SUMMARY

In general, this disclosure is directed to stitched sensors which include a plurality of threads stitched to a textile in a stitch geometry and methods for forming such stitched sensors. A stitched sensor may be configured as a stitched stretch sensor (e.g., configured to sense stretching of a textile) and/or a stitched bend sensor (e.g., configured to sense bending of a textile). For example, the plurality of threads of a stitched stretch sensor includes at least one conductive thread, and the stitch geometry of the sensor is configured such that an electrical property (e.g., resistance) of the stitched stretch sensor changes based on stretching and relaxation of the textile. A stitched bend sensor may similarly include at least one conductive thread, and the stitch geometry of the sensor may be configured such that an electrical property of the stitched bend sensor changes based on bending and unbending of the textile. In some examples, a single stitched sensor may be configured to sense both stretching and bending of a textile. In some examples, the textile may be a garment.

In one example, the disclosure is directed to a system including a stitched stretch sensor comprising a plurality of threads stitched to a textile in a stitch geometry, the plurality of threads comprising a conductive thread, wherein the stitch geometry is configured such that an electrical property of the stitched stretch sensor changes based on at least one of stretching and relaxation of the textile.

In another example, the disclosure is directed to a method including forming a stitched stretch sensor by at least stitching a plurality of threads to a textile in a stitch geometry configured such that an electrical property of the stitched stretch sensor changes based on at least one of stretching and relaxation of the textile, the plurality of threads comprising a conductive thread.

In another example, the disclosure is directed to a system including a plurality of threads stitched to a textile in a stitch geometry, the plurality of threads comprising a conductive thread and one or more non-conductive threads, wherein the stitch geometry is configured such that an electrical property of the conductive thread changes based on at least one of stretching and relaxation of the textile and a sensing unit electrically coupled to the conductive thread in the stitch geometry and configured to sense the change in the electrical property of the conductive thread.

In another example, the disclosure is directed to a system including a stitched stretch sensor comprising a plurality of threads stitched to a textile in a stitch geometry, the plurality of threads comprising a conductive thread, wherein the stitch geometry is configured such that an electrical property of the stitched stretch sensor changes based on bending of the textile.

In another example, the disclosure is directed to a method including forming a stitched stretch sensor by at least stitching a plurality of threads to a textile in a stitch geometry configured such that an electrical property of the stitched stretch sensor changes based on bending of the textile, the plurality of threads comprising a conductive thread.

In another example, the disclosure is directed to a system including a plurality of threads stitched to a textile in a stitch geometry, the plurality of threads comprising a conductive thread and one or more non-conductive threads, wherein the stitch geometry is configured such that an electrical property of the conductive thread changes based on bending of the textile and a sensing unit electrically coupled to the conductive thread in the stitch geometry and configured to sense the change in the electrical property of the conductive thread.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 1A and 1B are schematic diagrams illustrating an example of a looped conductor in relaxed and expanded form, respectively.

FIGS. 11A, 11B, 11C, and 11D illustrate several example International Organization for Standardization (ISO) standard stitch patterns.

FIGS. 16A and 16B are schematic diagrams illustrating equivalent example resistive circuits for an example stitched stretch sensor.

DETAILED DESCRIPTION

Figure 3:
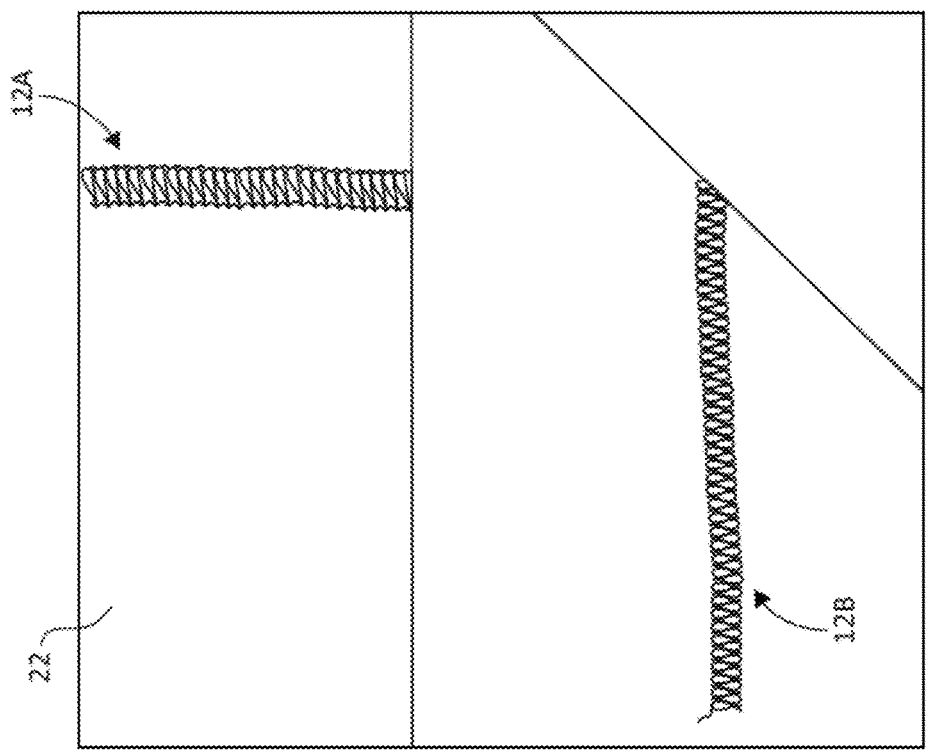
FIG. 3 illustrates an example of a top and bottom cover thread.

This disclosure is directed to stitched sensors that include a plurality of threads stitched to a textile in a stitch geometry and methods for forming such stitched sensors. Traditional techniques for sensing textile stretch may rely on components and approaches developed for sensing stretch outside of the wearable environment. Consequently, these traditional sensing techniques may not prioritize the physical comfort of the component parts. As described herein, textile-based sensing techniques which integrate comfortable properties of fibers, yarns, and textiles with electrical properties may yield more suitable sensing abilities in the context of a wearable environment. In addition, garment-integrated sensing systems and techniques can offer increased wearer comfort and simplify the donning and doffing process. However, garment-integration of electronic components may present manufacturing difficulties such as requiring new technologies and processes. This manufacturing and/or technological barrier may prevent industry from utilizing textile-based sensing techniques and systems, particularly in the case of apparel manufacture (which typically operates on a very short product cycle and often has limited time and/or resources to devote to large-scale changes in manufacturing processes).

As described herein, there are a number of methods that can be used to measure stretch, elongation, and/or bending of a textile. One of these methods includes a looped-conductor method. The looped-conductor method uses a looped conductor of specific resistance per unit length integrated into the textile, in which the loops of the conductor pass in and out of contact as the structure of the textile is stretched and relaxed. When one or more of the loops are in contact, the electrical length is shortened and resistance decreases. When one or more of the loops are separated, the electrical length is lengthened and the resistance increases. In a looped structure, stretching of the textile can either bring loops into contact or out of contact, depending on the architecture of the structure. In one example, two sensors having approximately identical lengths and properties (or calibrated to a particular state if non-identical lengths and/or properties), on either side of a non-extensible substrate, can be used to measure bend by evaluating the differential response between the two sensors. Alternatively, the deformation of the looped structure of one sensor during bending can also result in a change in electrical contact within the stitch and yarn structures, which can be correlated with the amount of bend occurring in the sensor and a textile.

There are a number of considerations in implementing wearable sensors and sensing devices. For example, when considering garment production and manufacture, it may be desirable to minimize the impact of integration of electronic components on the production and assembly process. The garment industry is somewhat resistant to changes in methods, owing largely to the very fast product cycle and continual pressure to decrease manufacturing costs; production of smart or electronically-enabled garments can present a fairly dramatic departure from the status quo.

In addition, the impact of the sensor on the wearer (e.g., the user of the wearable textile) may influence the development of wearable sensors. While many sensor applications (such as medical monitoring) may reasonably demand compromise on the part of the wearer's comfort (e.g., in a life-saving medical application), many applications may not be able to demand this kind of compromise without risking non-compliance or rejection of the device/garment by the user of the garment or the marketplace. Sensors and hardware that require aesthetic or physical discomfort may be less likely to be adopted by users. Further, even in medical monitoring scenarios, perceptibility or discomfort caused by the wearable device may create an "observer effect," e.g., by changing the user's everyday behavior.

Knitted stretch sensors, which may utilize the looped-conductor method, can be integrated directly into a textile (e.g., a garment) such that the loops of the knit structure are either brought into contact or separated when the knit is stretched. However, when applied in the process of knitting, they often must pass the entire length or width of the textile, are usually restricted to orientations parallel and perpendicular to the direction of knitting, and are most conveniently applied in the courses (horizontal) direction. When integrated into the textile goods directly, the knitted sensor poses additional challenges for garment patterning and assembly, whereby the garment pattern must accommodate the placement and location of the sensor in the raw goods. Similarly, seam crossings and integration of interconnects can be challenging when the sensor is a knitted stretch sensor.

The disclosure relates to stitched sensors (e.g., stitched stretch sensors and stitched bend sensors), which include a plurality of threads stitched to a textile (e.g., a garment) in a stitch geometry, and methods for forming such stitched stretch sensors. A stitched stretch sensor is described herein as a type of a stitched sensor. Other types of stitched sensors may be referred to as stitched bend sensors configured to detect bend or other stitched sensors configured to detect a particular type of textile change in conformation (e.g., a bend in a textile may or may not also result in stretch in the textile during the change in conformation of the stitched sensor). In some examples, the same stitched sensor may be configured to detect multiple changes such as a stretch (or relaxation) and a bend. In this manner, a stitched sensor may be configured to detect a change in conformation in a textile, such as stretching, relaxation, and/or bending. The stitched sensors described herein may thus be configured to detect any type of conformation change in the textile.

The stitch geometry may be any suitable stitch geometry, such as a coverstitch, an overlock stitch, or a lockstitch (e.g., a zigzag stitch). The plurality of threads of the stitched stretch sensor includes at least one conductive thread, and the stitch geometry is configured such that an electrical property (e.g., resistance) of the stitched stretch sensor changes based on stretching, relaxation, and/or bending of the textile. The conductive thread(s) may be substituted in place of traditional sewing thread(s) of the stitch geometry. In some examples (e.g., the top-thread coverstitched stretch sensor described below), relaxation of the textile and/or stitches of the stretch sensor bring loops of the stretch sensor into contact and stretching the textile and/or stitches brings loops out of contact, as illustrated in FIGS. 1A and 1B, respectively. FIG. 1A illustrates conductive thread 10A in the conformation where loops of conductive thread 10A contact each other. FIG. 1B illustrates conductive thread 10B in the conformation where loops of conductive thread 10B do not contact each other. Conductive threads 10A and 10B may be the same conductive thread in different conformations due to the stretched state of FIG. 1A and the relaxed state of FIG. 1B. Typically, the resistance of conductive thread 10A may be less than the resistance of conductive thread 10B. In other examples (e.g., the bottom-thread coverstitched stretch sensor described below), relaxation of the textile and/or stitches of the stretch sensor bring loops of the stretch sensor out of contact and stretching the textile and/or stitches brings loops into contact.

The systems described herein may also include a sensing unit (e.g., sensing unit 200 of FIG. 23) configured to sense the change in electrical property (e.g., resistance) of the stitched stretch sensor over time to monitor stretch and relaxation of the textile. Such a sensing unit may, in some examples, be worn by the user. For example, the sensing unit may be incorporated into the garment formed from the textile and worn by the user.

Stitched sensors, such as those described herein, may offer various advantages. For example, the stitched stretch sensor may be applied to the textile or garment surface at any location, even to a fully fabricated garment as a trim or embellishment, in contrast to knitted stretch sensors which generally require incorporation into the raw textile before the garment pieces are cut and sewn. Depending on the machine and stitch employed to create the stitched stretch sensor, the location and placement of the stitches can be customized at-will. In addition, sensors stitched using common commercial fabrication equipment (such as the sensors described here) require minimal changes to existing processes or technology.

The stitched stretch sensor may be defined by any characteristic suitable for sensing stretch of a textile. For example, the stitched stretch sensor may comprise any suitable number of threads. In some examples, the stitched stretch sensor (or any other stitched sensor such as a stitched bend sensor) comprises at least one conductive thread and one non-conductive thread. For example, the stitched stretch sensor may be formed from between two and six threads total, at least one of which is the conductive thread. In other examples, the stitched stretch (or bend) sensor may include more than one conductive thread to form more than one isolated stretch (or bend) sensor in the same stitch structure. For example, the stitched stretch sensor (or any type of stitched sensor) may include two conductive threads and at least two non-conductive threads, and may form two isolated stretch sensors in the same stitch structure. In some examples, the stitched stretch sensor may include one or more additional non-functional threads, which may be configured to add structural features to the stitched stretch sensor.

As discussed above, the conductive thread of the stitched stretch sensor may define a plurality of loops in the stitch geometry, such that the looped-conductor method may be utilized for sensing stretch of the textile to which the stitched stretch sensor is stitched. In some examples, when the textile and, in particular, the stitched stretch sensor, is stretched, at least some of the plurality of loops of the conductive thread may become farther apart. Similarly, when the garment is relaxed, at least some of the plurality of loops may become closer together. Alternatively, in other examples, depending on the stitch geometry, when the textile and, in particular, the stitched stretch sensor, is stretched, at least some of the plurality of loops of the conductive thread may become closer together, and when the textile is relaxed, at least some of the plurality of loops may become farther apart. As described above, in some examples, when the loops of the conductive thread become closer together, this causes shorts between the loops such that the resistance of the stitched stretch sensor is reduced or decreased. Conversely, when the loops of the conductive thread become farther apart, some of the shorts between loops are removed and resistance of the stitched stretch sensor is increased.

The electrical property (e.g., the resistance) of the stitched stretch sensor that changes based on stretching and relaxation of the textile may fall along a spectrum. For example, resistance of the stitched stretch sensor may fall along a spectrum from all loops of the conductive thread being closed to all loops of the conductive thread being open. In other words, some loops may be open and other loops may be closed at any given time. In this way, in some examples, the resistance of the conductive thread may be correlated to stretching of the textile and, in particular, to stretching of the stitched stretch sensor. In some examples, a calibration period may be required, e.g., for a particular wearer, to determine a correlation between resistance and stretching of a particular textile (e.g., a particular garment). In examples in which loops of the conductive thread become closer together upon stretching of the textile, there may be no end to decreases in resistance as elongation of the textile increases.

The resistance (or other electrical property) of the stitched stretch sensor may be measured and analyzed in any suitable manner. For example, as mentioned above, a sensing unit (e.g., sensing unit 200 of FIG. 23) may be coupled to the conductive thread and configured to measure the resistance of the conductive thread as the stitched stretch sensor is stretched and relaxed. In some examples, the sensing unit may include a processor (e.g., processor 202 of FIG. 23) that is configured to analyze the resistance of the conductive thread to determine a parameter indicative of the stretch of the garment based on the measured resistance.

The stitched stretch sensor (or any other type of stitched sensor) may be stitched to any suitable portion of the textile or garment. In some examples, the stitched stretch sensor may be stitched proximate to an edge of the garment such that the stitched stretch sensor creates a hem of the garment. In other examples, the stitched stretch sensor may be stitched to a substantially more middle portion of the garment as an embellishment of the garment, or as a trim of the garment. In other examples, the stitched sensor may form the seam that joins two pieces of the garment, either on top of the seam or along the edge, binding the cut edges of the two pieces.

The stitched stretch sensor may be formed by stitching the plurality of threads to the garment in the stitch geometry. In some examples, the stitched stretch sensor may be formed by a suitable industrial stitching machine or a home sewing machine.

Although the examples described herein describe changing resistance of a stitched stretch sensor in response to and based on stretching and relaxation of a textile, in other examples, any suitable electrical property of the stitched stretch sensor may be used. For example, a resonant frequency of the stitched stretch sensor may be analyzed and correlated to stretching and relaxation of the textile. In addition, stitched sensors may be configured to detect bend and/or other types of changes in a textile in addition to, or instead of, detecting stretch or relaxation. In this manner, a stitched sensor may include a stitched stretch sensor, a stitched bend sensor, and/or a stitched sensor configured to detect any other type of change in the sensor or textile to which the sensor is stitched.

Example 1

Figure 2:
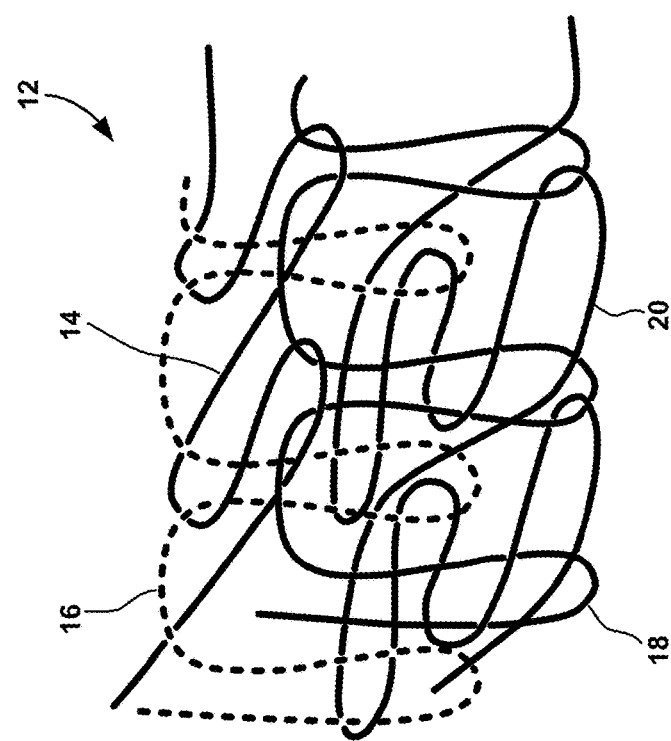
FIG. 2 is a schematic diagram illustrating an example coverstitch structure.

The following example describes a particular example of a stitched stretch sensor, namely a top-thread coverstitched stretch sensor, such as coverstitched sensor 12 of FIG. 2.

The top-thread coverstitched stretch sensor (e.g., coverstitched sensor 12) uses a looped-conductor technique implemented through the use of an industrial coverstitch machine to create a stretch sensor that is easily manufactured and replicates the comfort properties of most cut-and-sewn knit garments. This stitch technique has various advantages, such as ease of manufacture using existing, common apparel production technology, and comfort properties akin to performance sports apparel.

The top-thread coverstitched stretch sensor may be fabricated using the top thread of a standard industrial coverstitch machine. As shown in FIG. 2, coverstitched sensor 12 includes top cover thread 14, bottom cover thread 20, needle thread 16, and needle thread 18. The machine is common in apparel production and offers the ability to easily fabricate custom-placed stretch sensors on textile and apparel products. The sensing properties of the stitch are enabled by a conductive thread which increases its electric resistance as the fabric is stretched, due to the geometry of the stitches (or "stitch geometry").

In this example, the stitch used here to create a stretch response may be formed by an industrial stitching machine, such as the Juki MF-7723 high-speed, flat-bed coverstitch machine. The machine is configured to produce a standard industrial two-needle coverstitch with top and bottom cover (stitch class 602), such as coverstitched sensor 12. This stitch uses two needle-threads (e.g., needle thread 16 and needle thread 18) in conjunction with a bottom looper thread (e.g., bottom cover thread 20) to form a two-thread chain stitch at each needle stitch. The top cover thread (e.g., top cover thread 14) is brought back and forth between the needle threads 16 and 18 without passing through the fabric, and as such is caught in a serpentine looped structure on the face of the fabric by the needle threads. This stitch structure or stitch geometry is schematically illustrated in as coverstitched sensor 12 of FIG. 2, and depicted in FIG. 3. FIG. 3 illustrates an example textile 22 with coverstitched sensor 12, showing bottom cover thread 20 as sensor view 12A and top cover thread 14 as sensor view 12B.

The coverstitch may be used in seaming and finishing knit garments (although it may be used in other situations as well). For example, the same coverstitch without the top cover thread is a common method of hemming t-shirts. The top cover may be useful in creating low-profile, flat and lapped seams (such as the flatlocked seams seen on some performance sportswear). It can be applied to the surface of a garment in a similar manner to most lockstitched or embroidered topstitching or embellishment.

To form a stretch sensor or bend sensor, the top cover thread 14 may be replaced with a conductive yarn or thread of some measurable resistance per unit length. For example, the conductive thread may include conductive X-static silver-plated Nylon yarn, produced by Noble Biomaterials, applied to 98% polyester 2% Lycra jersey knit fabric using standard cone thread in all other threads of the coverstitch. Analysis of a stitched sensor using the X-static silver-plated Nylon yarn showed a sensor response on the order of 10 ohms, with almost linear behavior prior to saturation (when the stitch is fully stretched) for relatively low-frequency extensions of 119% of initial sample length of the garment (i.e., a textile). An equivalent electrical model is presented for theoretical modeling of the sensor behavior. Other types of conductive threads may be used in other examples.

Figure 4:
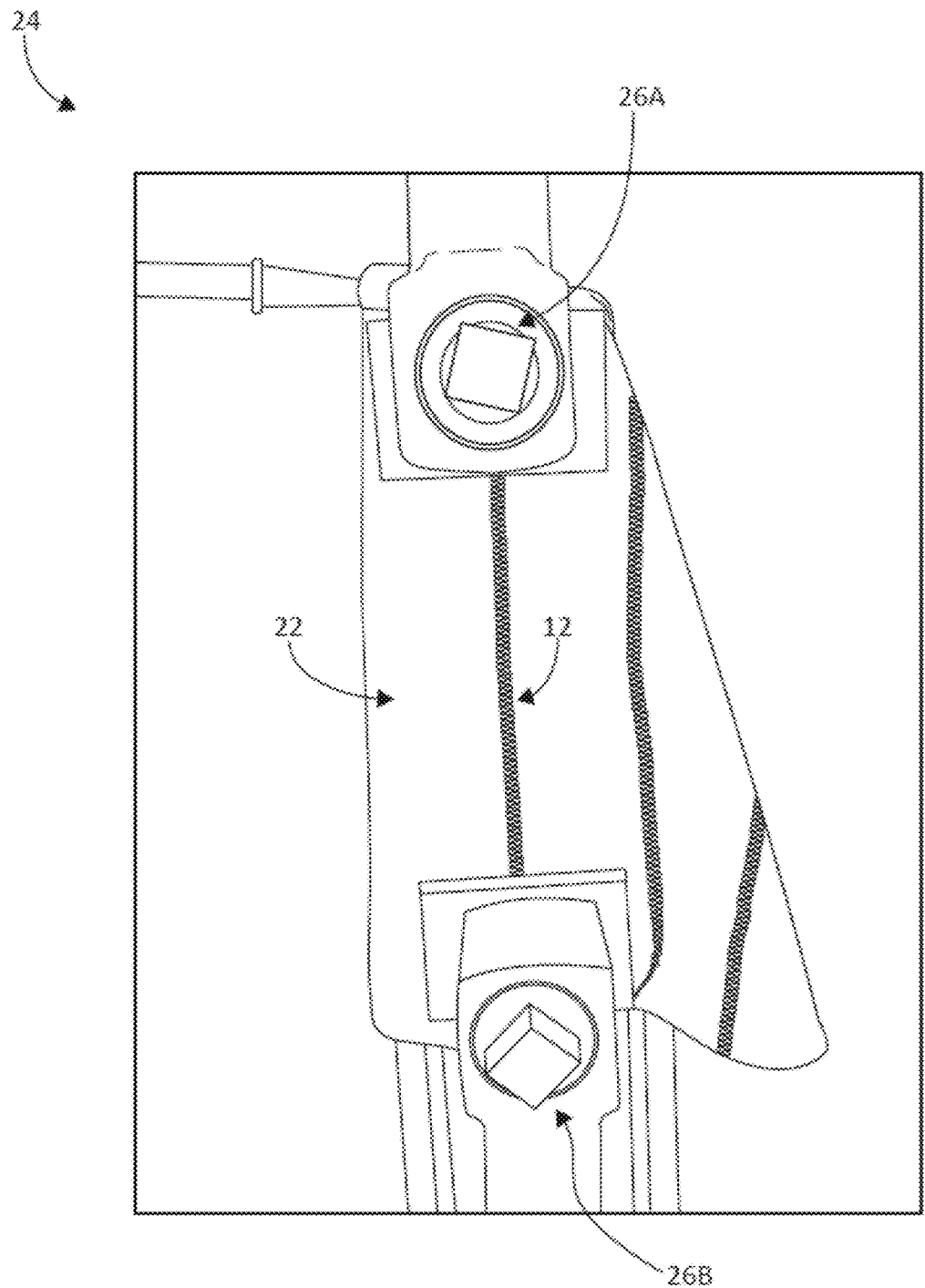
FIG. 4 illustrates an example experimental setup for testing a stitched stretch sensor.

As shown in FIG. 4, coverstitched sensor 12 and textile 22 are shown positioned within a test setup 24. To evaluate the resistance response of an example coverstitched stretch sensor 12, the sensor was stretched using an Instron tensile tester. Resistance of the sensor was measured using a BK-Precision 2831E Digital Multimeter (DMM). The test setup 24 is illustrated in FIG. 4, with clamp 26A attached to one end of textile 22 and coverstitched sensor 12 and clamp 26B attached to an opposite end of textile 22 and coverstitched sensor 12. The sensor 12 was stretched from its initial length of 4.75 inches (12.07 cm) to a final length of 5.65 inches (14.35 cm), 5 times (i.e., over 5 cycles). The actual measured length of the sensor is 8.75 inches (22.23 cm), since the section of sensing stitch (e.g., the conductive thread) between the two Instron clamp plates 26A and 26B is restricted and unable to be stretched during the test. Each Instron plate is approximately 2 inches (5.08 centimeters (cm) long, in the direction of the sensor. Both top and bottom plates 26A and 26B were isolated from the sensor 12 with a layer of neoprene on each side to prevent the sensor 12 from shorting over the length of the conductive plates. This adds a constant bias to the resistance measurements during the stretch, equal to the resistance between the plates of about 20 measured ohms for each pair. The Instron was used to record extension at sampling frequency of 10.0 Hertz (Hz), while the DMM measured the sensor resistance simultaneously at a sampling frequency of 3.3 Hz, the fastest available rate of the DMM USB command interface. Data from the two instruments were subsequently aligned and overlapped using digital timestamps, and the data is shown in FIG. 5

Figure 5:
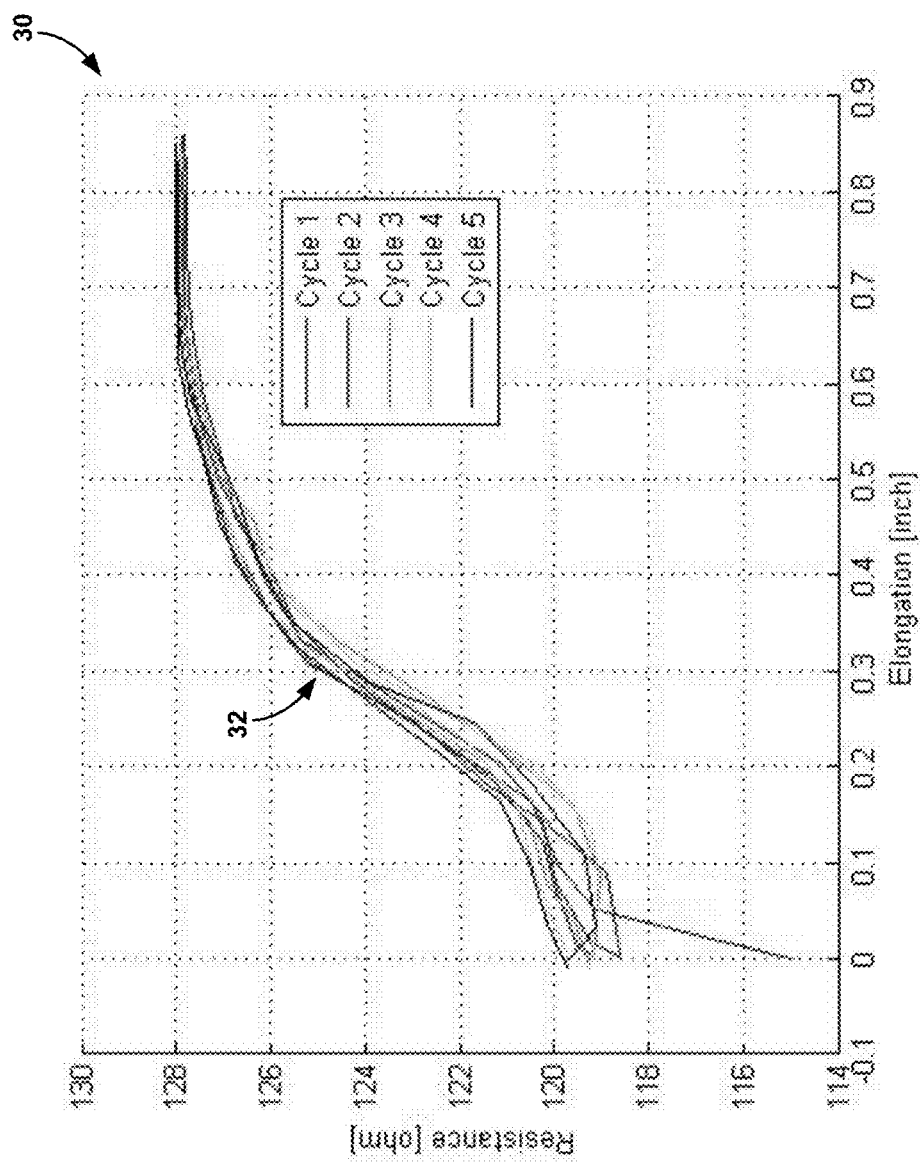
FIG. 5 is a graph showing results of testing an example top-thread coverstitched stretch sensor.

FIG. 5 illustrates graph 30 of resistance vs. elongation of the tested top-thread coverstitched sample (e.g., coverstiched sensor 12) that was approximately 4.75 inches (12.07 cm). Curves 32 include the data for each of the five different stretch and recovery cycles of the test. In this example, the sensor 12 was stretched a maximum elongation of 0.9 inches (2.29 cm). Stretch and recovery phases of the cycles overlap with respect to extension, as shown in FIG. 5. For example, between 0.2-0.6 inches (0.5-1.5 cm), the curves 32 show the largest resistance variation which then settles to the maximum sensor resistance value between 0.6-0.9 inches (1.5-2.3 cm). In addition, between 0-0.2 inches (0-0.5 cm), the variation is slower during both phases because the sensor has relaxed to its actual length and there are no more loops to close during the recovery phase, and analogously there are not many opening loops during the stretch phase.

It is noted that the first value of the resistance (first sample of cycle 1) in graph 30 is smaller than the other initial values at zero extension. The initial length of the fabric substrate is slightly shorter than the recovery length following the first extension. This may prevent some stitches that were originally in "closed" or "ladder" configuration from returning to their original state after the first extension. However, subsequent extensions show a return to a more regular baseline recovery resistance.

Figure 6:
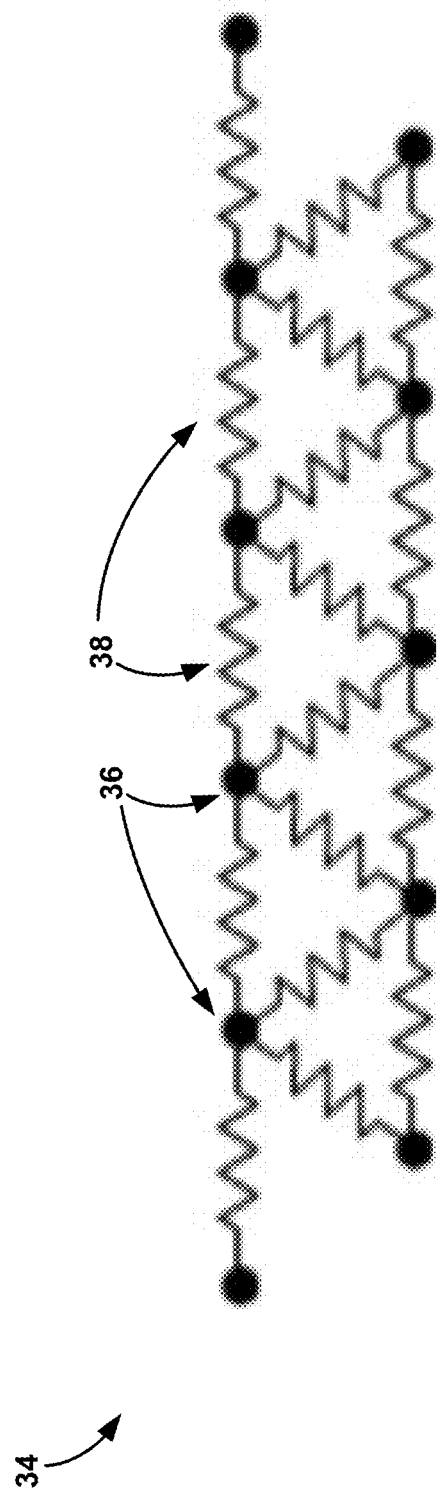
FIG. 6 is a schematic diagram illustrating an equivalent resistive circuit for an example stitched stretch sensor.
Figure 7A:
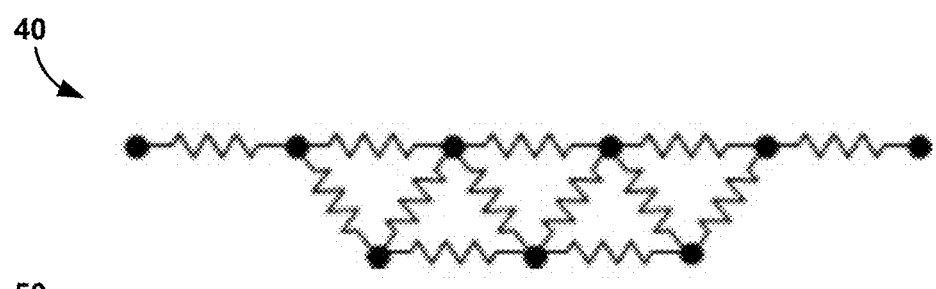
FIGS. 7A-7C are schematic diagrams illustrating equivalent resistive circuits for an example stitched stretch sensor.
Figure 7B:
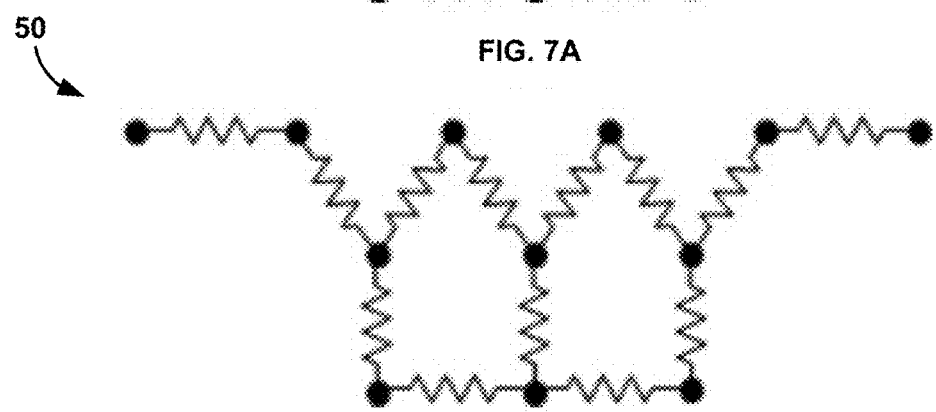
Figure 7C:
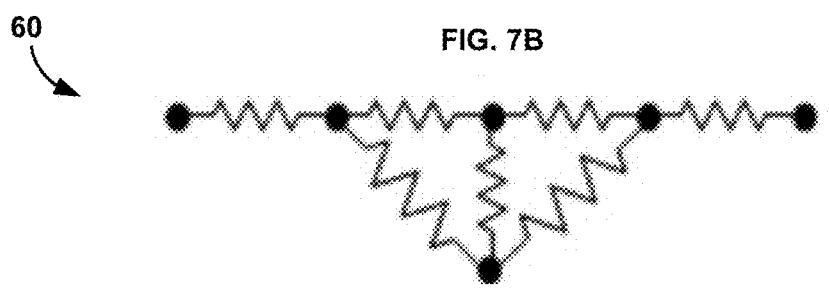
Figure 8:
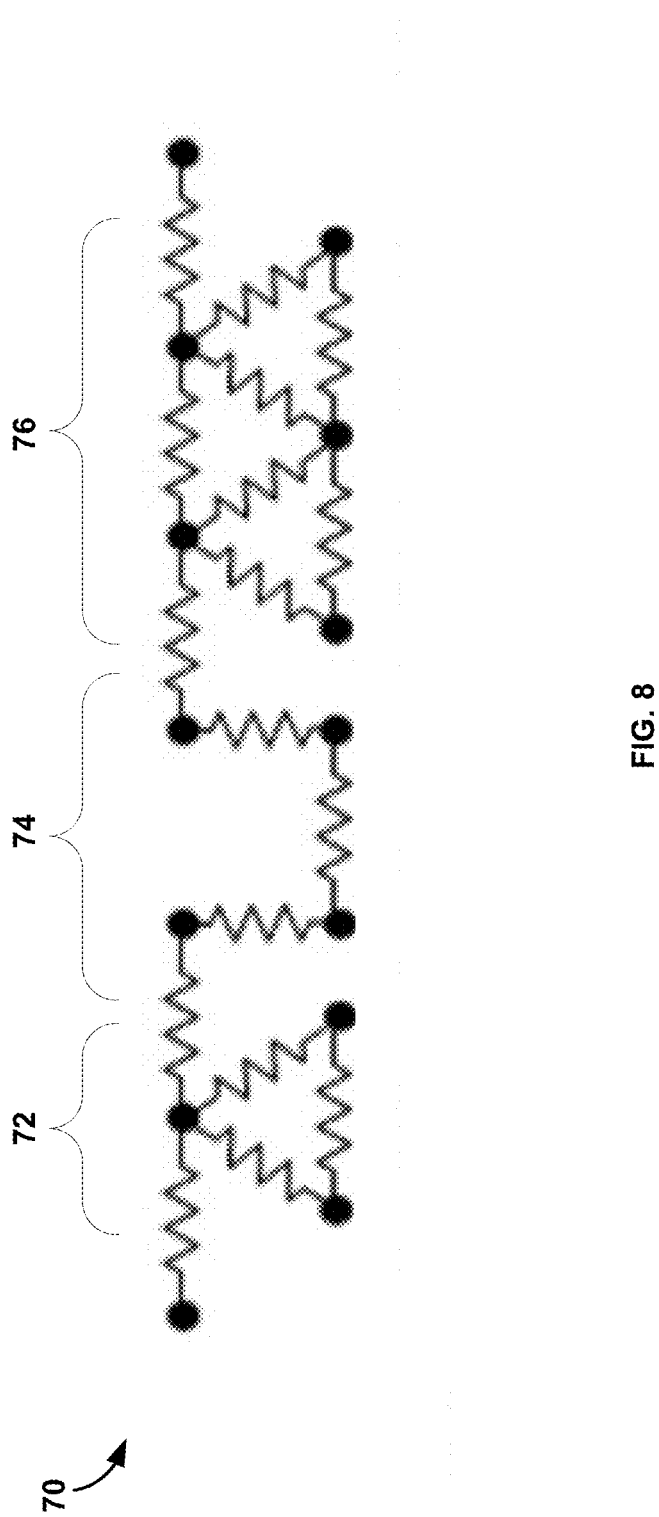
FIG. 8 is a schematic diagram illustrating an example equivalent resistive circuit for a stitched stretch sensor.

As shown in FIGS. 6-8, the stretch sensor (e.g., sensor 12 or other stitched sensors) can be modeled as an equivalent resistive circuit. As shown in FIG. 6, when the sensor 12 is not stretched, all stitches of the thread may be touching, and the resulting electric circuit 34 is an anti-ladder topology of resistors. Electric circuit 34 includes multiple resistors 38 (e.g., portions of the conductive thread) and multiple nodes 36 (locations at which the conductive thread overlaps). In the present example, each resistance value was calculated according to the measured resistance per unit length of the X-static thread, equal to approximately 0.81 ohms/cm. By iteratively using a Delta-Y transform and combining the resistances either in series or parallel, as illustrated in FIGS. 7A-7C, the total resistance of such topology may be evaluated. For example, FIG. 7A illustrates base configuration 40 after the first reduction. FIG. 7B illustrates configuration 50 using the Delta-Y transform, and FIG. 7C illustrates new base configuration 60 after the second reduction.

In the present example, the total resistance of the anti-ladder circuit 34 shown in FIG. 6 may be much smaller than the measured resistance at the beginning of the cycles. For instance, the equivalent of 8.91 ohms when resistors are in series may be 0.96 ohms when resistors are in anti-ladder configuration of circuit 34. Thus, not all stitches (e.g., loops of the conductive thread) may be in contact when the sensor 12 is in the relaxed conformation. In order to fully characterize the sensor, some possible basic configurations that the sensor's stitches may have right after that the sensor is fabricated were modeled, as shown in FIG. 8. In particular, example circuit 70 FIG. 8 illustrates a combination of a "closed" stitch 72 configuration where the resistors' Delta is shorted, an "open" stitch 74 configuration where the resistors are in series, and a "ladder" stitch 76 configuration where the resistors are in anti-ladder topology (similar to circuit 34 of FIG. 6).

As the fabric (or textile) gets stretched, the number of "closed" (e.g., shorted resistance) or "ladder" stitches decreases resulting in a larger value of the resistance of the conductive thread until all stitches are "open" (i.e., resistance in series) to have the series of all resistors in the model (i.e., the maximum value of the stitch sensor resistance). In the same way, as the fabric recovers the number of shorted or "ladder" stitches increases, reducing the resistance until its initial value, since some of the stitches are now "closed" again. Assuming at zero extension "closed" or "open" stitches only, the number of stitches in "closed" configuration at the beginning of the extension can be estimated. This assumption is supported by the fact that stitches in the "ladder" configuration have very small resistance.

Figure 9:
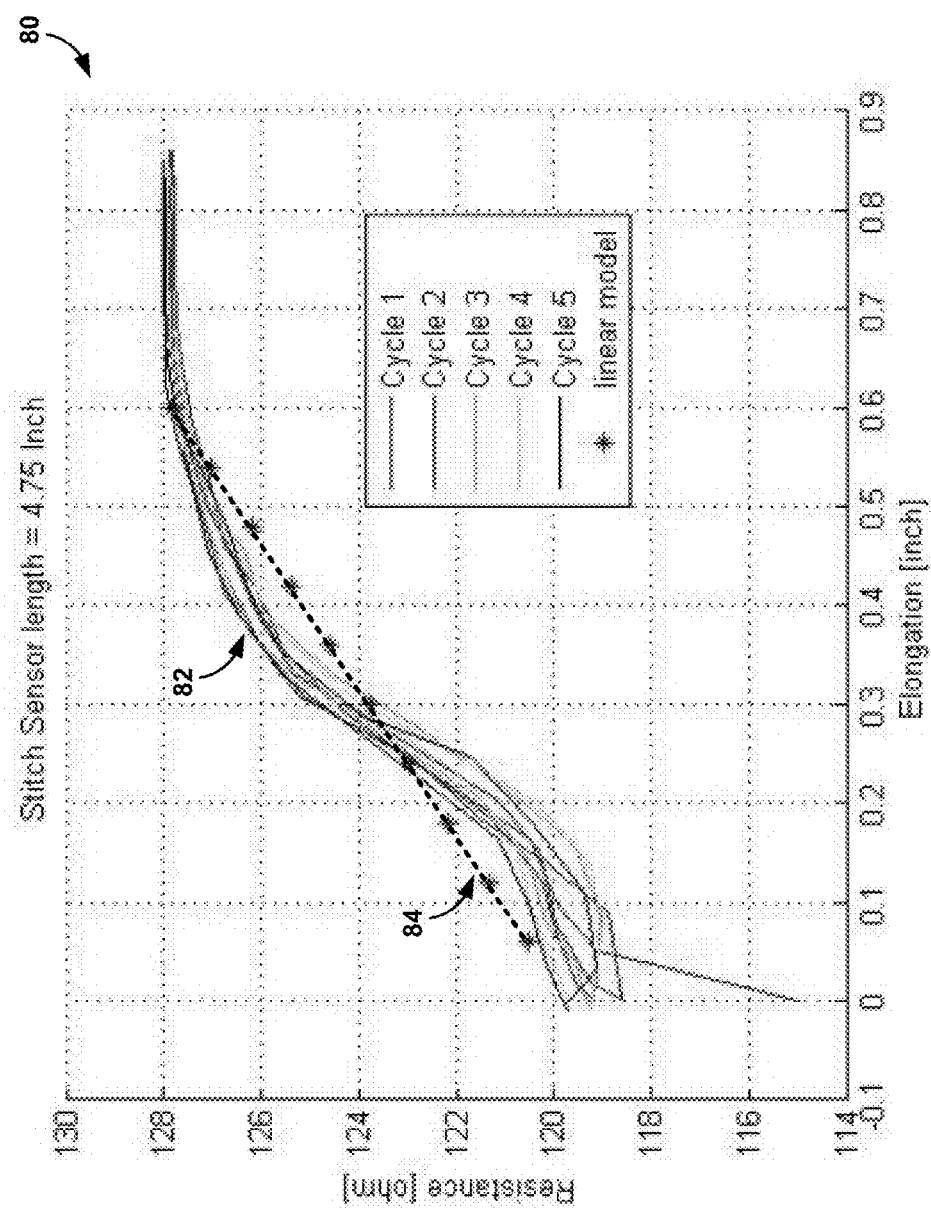
FIG. 9 is a graph showing results of testing an example top-thread coverstitched stretch sensor.

FIG. 9 depicts graph 80 with curves 82 and a linear model 84 calculated based on the above assumptions in which the same number of closed stitches that are gradually opening at equi-spaced extension points is considered, between 0-0.6 inches (0-1.5 cm). Graph 80 of FIG. 9 overlays these calculated points of linear model 84 on the empirical results (i.e., curves 82) shown in FIG. 5. As shown in FIG. 9, curves 82 are not identical for each cycle and it appears that the stitches open during the stretch phase and close during the recovery phase with higher rate around 0.3 inches (0.75 cm) than at the beginning of the extension (where the stitches are closed) or before the saturation of the resistance (where most of the stitches are already in the "open" configuration). When the resistance saturates (e.g., near the higher end of the elongation of the sensor), all the stitches are "open" thus the rate of change for the resistance just discussed is zero.

Figure 10:
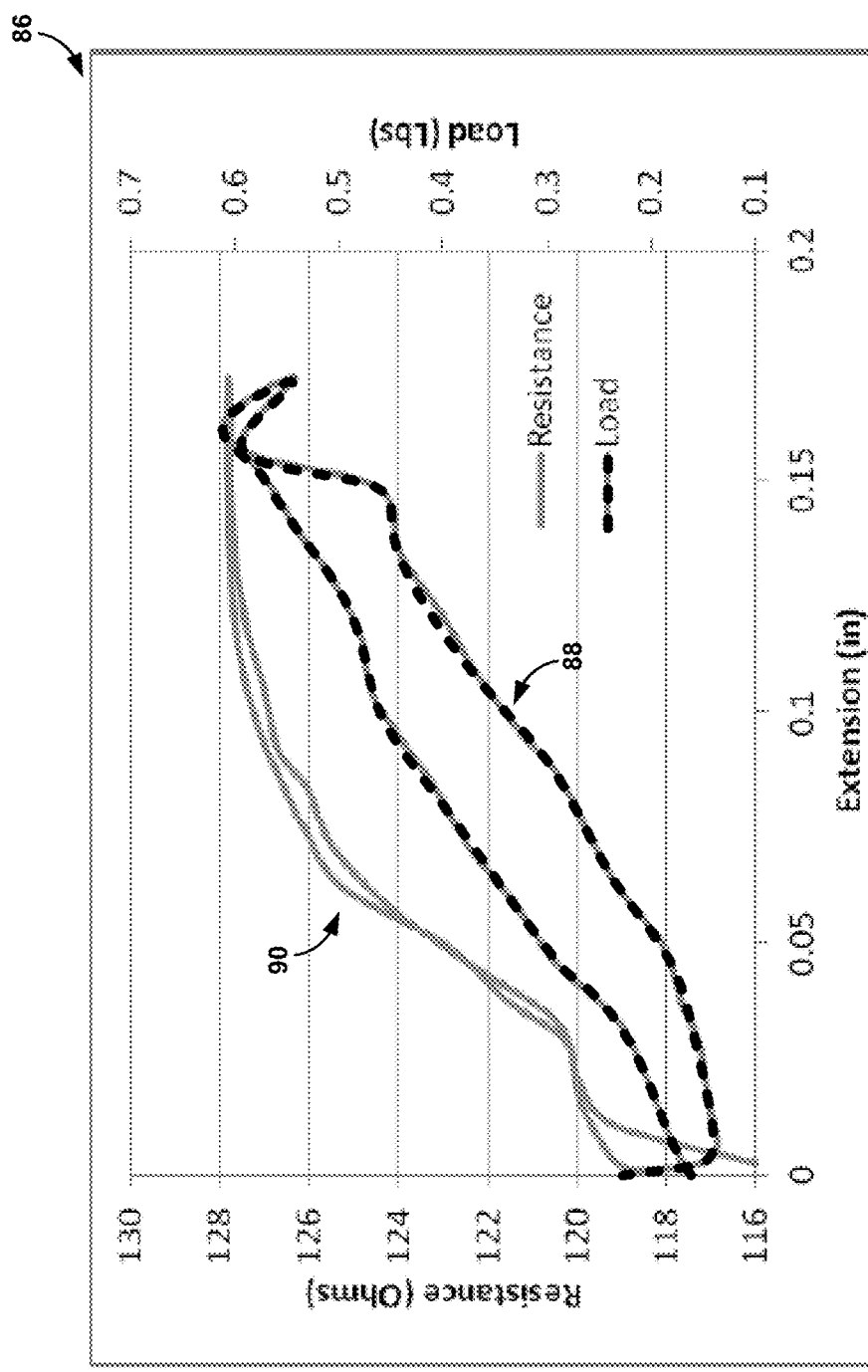
FIG. 10 is a graph showing results of testing an example top-thread coverstitched stretch sensor.

Response of a stretch sensor may be dependent on the elastic properties of the sensor itself (which may or may not be equivalent to the elastic properties of the sensing material or sensor structure). In the case of this coverstitched sensor 12, this response is directly apparent. For example, the elastic properties of the fabric substrate (i.e., the textile) have an influence on the behavior and response of the sensing conductor (i.e., the conductive thread), both in the elongation and recovery phases. As shown in FIG. 10, graph 86 illustrates the applied load 88 and sensor resistance 90 versus elongation of the sensor. FIG. 10 shows the force applied (applied load 88) to the textile sample at each elongation measurement during stretching and recovery, plotted with the resistance 90 change of the stretch sensor. Both curves from load 88 and resistance 90 represent the first stretch cycle of the experiment on the sample sensor. The correlation coefficients for these relationships are: extension/resistance $r=0.92$; resistance/load $r=0.83$; load/extension $r=0.93$. These correlation coefficients may indicate that the tested sensor may be more reliable at measuring extension than measuring load.

In the case of stitched sensor 12 described herein, a garment formed from a knitted fabric with an elastomeric component (e.g., one or more conductive or non-conductive threads) is used. The elastomer (examples of elastomeric fibers are trade names Spandex and Lycra) may aid in recovery of a knit fabric. For example, non-elastomeric knits stretch by allowing the knitted loops of the conductive thread to change shape and slide over each other, but there may not be sufficient counter-force to aid recovery. This insufficient counter-force may result in standard knits "stretching out" or "bagging out" (e.g., due in part to changes in the arrangement of loops within the knit or friction between loops of the yarn that limit full recovery) after extension. Elastomeric fibers stretch within the fiber may be used as the core of a knitted yarn, around which a non-elastomeric fiber may be wrapped. Thus, an elastomeric knit can extend both through the deformation of loops and through extension of the loop yarns themselves. Similarly, elastomeric fibers return easily to their original length when force is removed, thus reducing or eliminating the need for outside counter-force to help the textile recover following elongation. Elastomeric knits may be less likely to "stretch out" or fail to recover. Thus, in some examples, elastomeric knits may have improved responsiveness, repeatability, and drift for stitched sensors in which they are used. Non-elastomeric knits may, in some examples, be more likely to show drift behavior, as the non-recovered textile area would hold more stitches in "open" position. In theory, the maximum sensor response may remain stable (all stitches in "open" position) as the textile stretches out, but the full recovery baseline may also drift as the textile stretched out. In other examples, elastomeric fiber content may provide limited benefit to the knit used for a stitched sensor.

Stitched sensors configured to sense stretch in clothing may offer a potential for monitoring physiological status indicators (such as breathing), body positions, and movements (activity or context), and even creation of novel user interface elements. However, worn sensors, especially those integrated into clothing, may be advantageously (A) comfortable and unobtrusive for the wearer and (B) compatible with garment production processes (such as traditional machines or manufacturing techniques). Any stitched sensor presented here may be constructed using readily available industrial garment-production equipment and may leverage a stitch structure common in everyday apparel. The stitched sensor may not require any perceptible compromise in user comfort and may minimize the need to change or modify any typical garment production processes or equipment.

As discussed here, the stitched sensor's behavior may be fairly linear in an active region of elongation and recovery and correlated with both load and elongation (although the stitched sensor may be more closely correlated with elongation). The behavior of a particular sensor subject to repeated elongations, time, and laundering (effects of oxidization and repeated flexing), and the influence of the textile substrate, may be based on the materials and/or configuration of the sensor. Benefits of a stitched sensor may include wearer comfort and ease of fabrication.

Example 2

The following example describes a particular example of a stitched stretch sensor, such as an overlock stitched stretch sensor. The theory of operation of the top cover thread stretch sensor described above in Example 1 may be similar to the theory of operation for the overlock stitched sensor described in this example. The overlock stitched sensor may be formed with either of the two looper threads of a 3-, 4-, or 5-thread overlock stitch. For example, any of the loopers of the ISO standard classes of stitch illustrated in FIGS. 11A-11D may be used to make an overlock stitched stretch sensor.

In the example of FIG. 11A, stitch 92 is an overedge stitch classified as ISO #504. Stitch 92 is formed by one needle thread and two looper threads producing a purl on the edge of the seam. Use of stitch 92 may include overedge seaming and serging. Diagram 93 indicates the pattern of stitch 92. In the example of FIG. 11B, stitch 94 is also an overedge stitch classified as ISO #512. Stitch 94 is formed by two needle threads and two looper threads forming a purl on the edge of the seam, as the 512 right needle only enters the upper looper loop. Diagram 95 indicates the pattern of stitch 94. In the example of FIG. 11C, stitch 96 is an overedge stitch classified as ISO #514. Stitch 96 is formed with two needle threads and two looper threads with the looper threads forming a purl on the edge of the seam, and the 514 stitch includes both needles entering the upper looper loop. Diagram 97 indicates the pattern of stitch 96. In the example of FIG. 11D, stitch 98 is a safety stitch classified as ISO #516. Stitch 98 is formed with five threads, combining a single needle chainstitch (ISO #401) and a three thread overedge stitch (ISO #504) that are formed simultaneously. Diagram 99 indicates the pattern of stitch 98. The particular loopers illustrated in FIGS. 11A-11D are shown as just some examples for a stitched sensor, and other loopers may be used for overlock stitched stretch sensors in accordance with the techniques described herein.

Figure 12A:
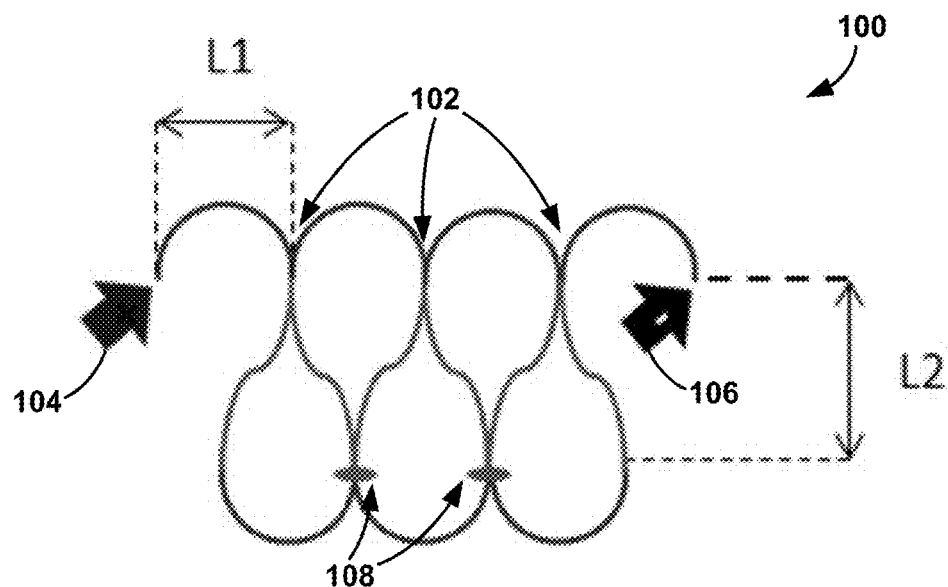
FIGS. 12A and 12B are schematic diagrams illustrating an example overlock stitch in a relaxed and stretched configuration, respectively.
Figure 12B:
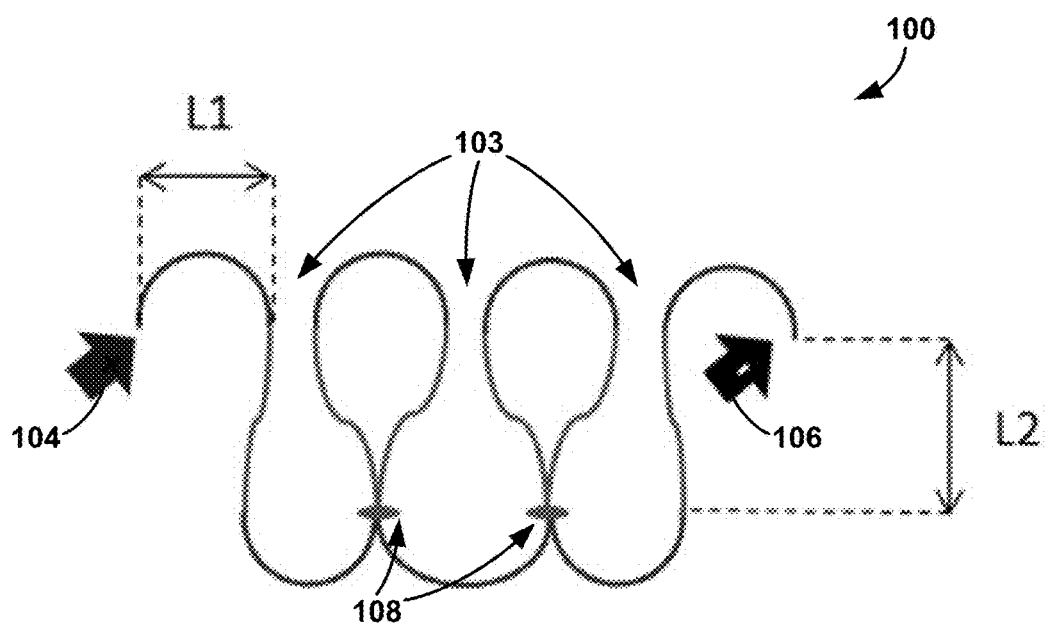

In some examples, the overlock stitched stretch sensor may be stitched on the edge of a piece of cloth/textile, and the overlock stitching machine may trim the edge of the fabric before stitching the overlock stitched stretch sensor to the fabric (e.g., the overlock stitch binds the raw edge). The overlock stitched sensor may be based on a constrained version of the looped conductor method used in the top-thread coverstitched sensor 12 described above. A variation on this method used in the 514-class overlocked sensor is illustrated as sensor 100 in FIGS. 12A and 12B. Positive terminal 104 and negative terminal 106 indicate the direction of current through sensor 100. The conductive yarn of sensor 100 passes through loops created by the inner needle thread. Adjacent loops of conductive thread are held in contact by this loop formed by the inner needle thread, as illustrated in the two cases of a completely relaxed sensor 100 of FIG. 12A and fully stretched sensor 100 of FIG. 12B. In FIGS. 12A and 12B, the needle thread loop, formed in the Z direction perpendicular to the page, is illustrated as the circles 108.

When the overlock stitched stretch sensor is relaxed as shown where the loops contact each other at locations 102 of FIG. 12A, the equivalent electrical model is an anti-ladder configuration of resistors, as described above in Example 1 top-thread coverstitched stretch sensor. When the overlock stitched stretch sensor is stretched as shown where the loops are separated from each other at locations 103 of FIG. 12B, the output resistance is given by a series of resistors. Because the overlocked sensor in the stretched position forms shorts on the inner needle side and closed loops on the fabric edge, and referring with n to the total number of inner and outer loop halves (n=5 loops in the diagram considered below), and with R1 and R2 to the equivalent electric resistance corresponding to L1 and L2 of FIGS. 12A and 12B, the total equivalent resistance of the stretched overlock stitched stretch sensor may be equal to:

$$R_{total} = \left(\frac{n+1}{2} + 2\right) * R1 + 2 * R2$$

Figure 13A:
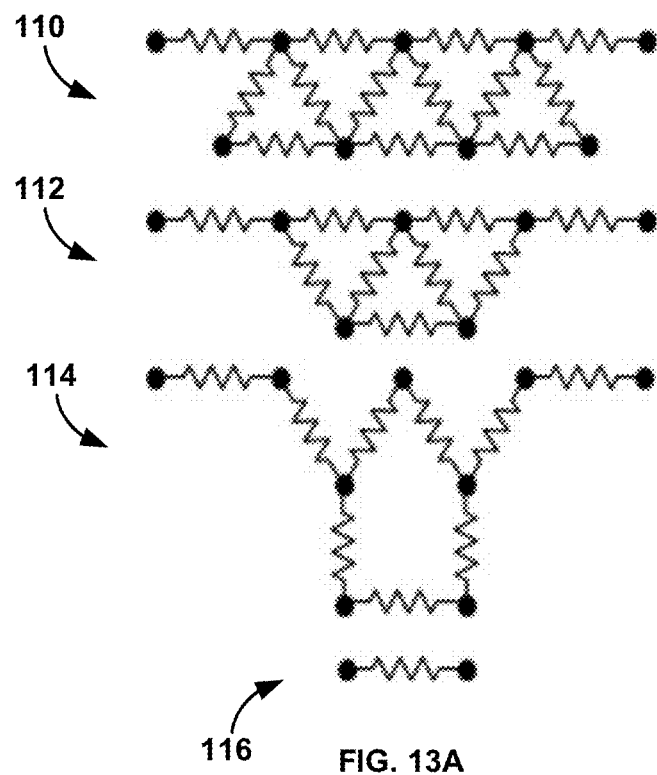
FIGS. 13A and 13B are schematic diagrams illustrating example equivalent resistive circuits for an overlock stitched stretch sensor.
Figure 13B:
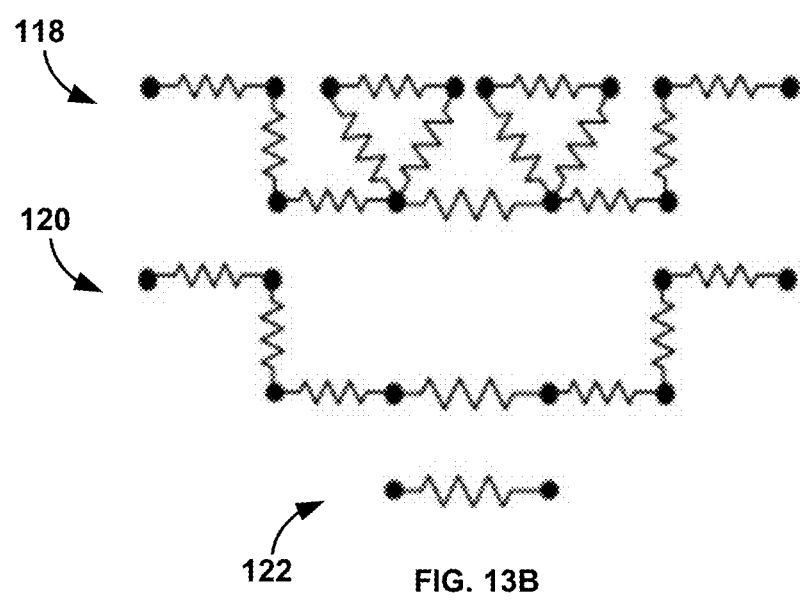

FIG. 13A illustrates equivalent resistance models 110, 112, 114, and 116 for an overlock stitched stretch sensor in a relaxed configuration. FIG. 13B illustrates equivalent resistance models 118, 120, and 122 for an overlock stitched stretch sensor in a stretched configuration.

According with the convention used for measuring the total resistance $R_{total}$, the overlocked sensor's $R_{total}$ may be smaller that the total resistance of an equivalent top-thread coverstitched stretch sensor by a factor of:

$$\frac{n-1}{2} * (2 * R2 + R1)$$

The crossing yarn of the sensor holds together in contact adjacent bottom loops during stretch (as shown in FIG. 12B). This configuration may determine isolated triangles that are shorted from the series of resistors. Practically, the fabric through which the needle thread passes extends during the stretch and the needle thread loop looses some amount of contact between adjacent strands. The degree to which the needle loop opens up may depend on the elasticity of the fabric/textile the stitched sensor is integrated on, thus the stitched sensor may provide larger resistances for fabrics with more elasticity during the stretch of the sensor than for fabrics with less elasticity.

Figure 14:
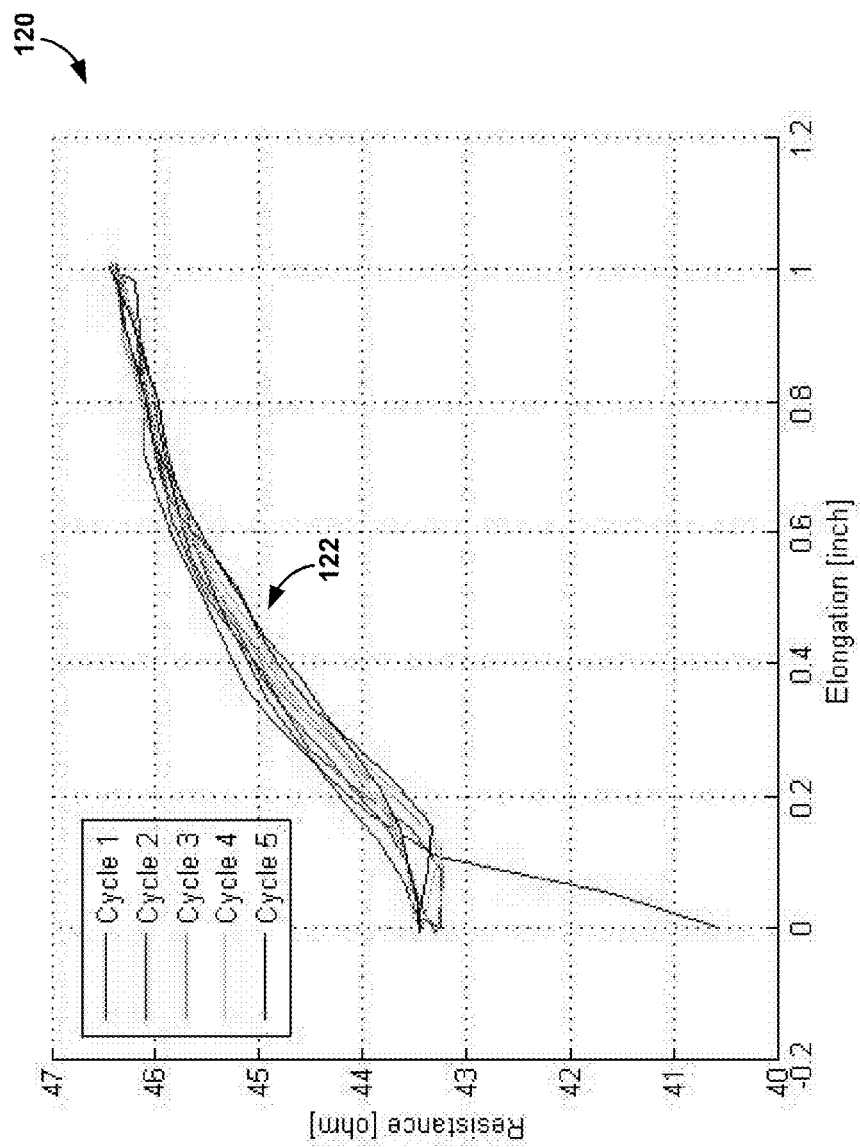
FIG. 14 is a graph showing test results of testing an example overlock stitched sensor.
Figures 15A, 15B:
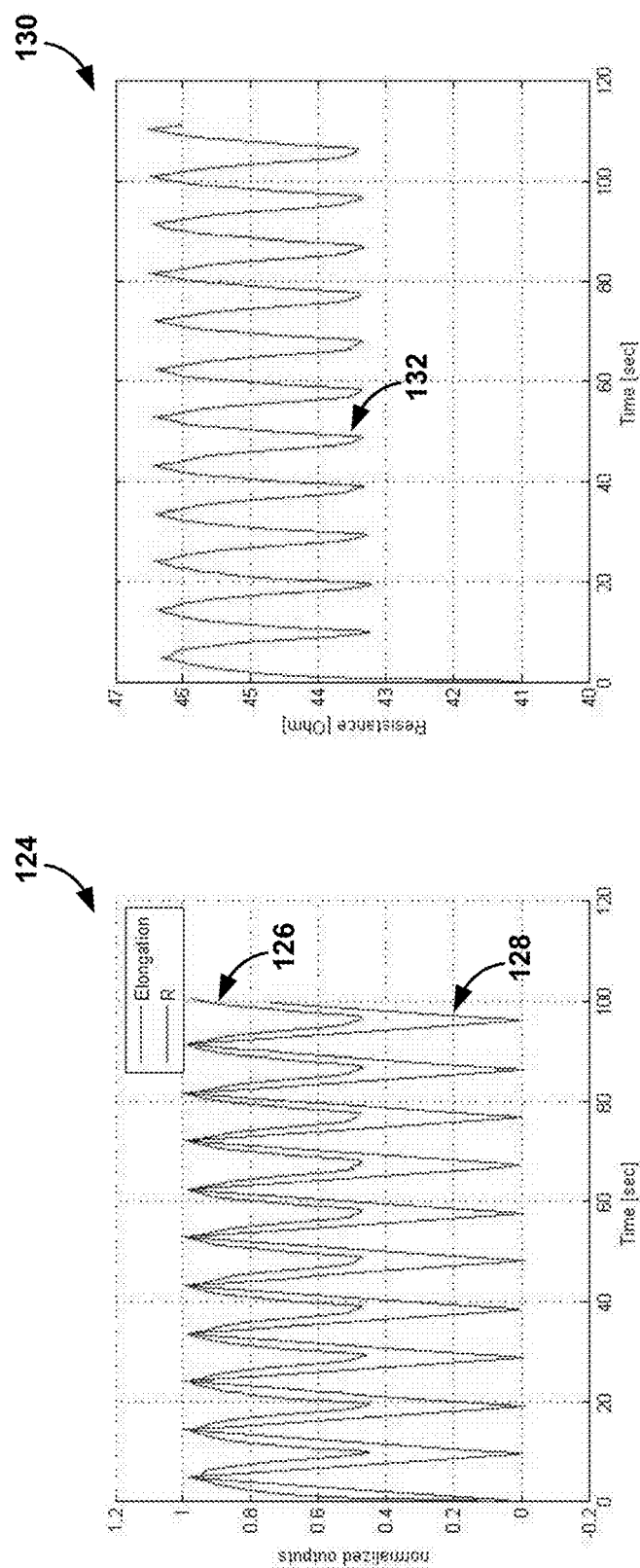
FIGS. 15A and 15B are graphs showing test results of testing an example overlock stitched sensor.

FIGS. 14, 15A, and 15B illustrate testing results for an example overlock stitched stretch sensor. FIG. 14 illustrates graph 120 in which data for sensor resistance vs. elongation for each of 5 repetitive cycles are shown as cycles 122. FIG. 15A shows graph 124 of the normalized resistance 126 of the sensor aligned with the extension of the sensor (i.e., elongation 128) during the testing cycle. FIG. 15B illustrates a graph 130 of an output response 132 of the overlock stitched stretch sensor for 10 repeated cycles of 25% stretch, starting and ending in a relaxed (no extension) position. Output response 132 is shown as a resistance in Ohms, typically between approximately 43 and 47 Ohms for each cycle of elongation of the sensor.

Example 3

The following example describes a particular example of a stitched stretch sensor, namely a bottom-thread coverstitched stretch sensor. The bottom-thread coverstitch loops (e.g., ISO#406 or 602) may be modeled as resistors in series, whether the stitch is stretched or relaxed. Such a stitched sensor can theoretically be modeled by a series of basic z-shaped serpentine resistors interconnected between each other by another resistor, e.g., resistor model 134 of FIG. 16A. Practically, and as shown in FIG. 16A, the resistors on the bottom edge of the basic z-serpentine are shorted because the conductive wire in the actual stitch overlaps with itself. Thus, the resistor model in the relaxed configuration may be further simplified, as shown as resistor model 136 of FIG. 16A. When the sensor is stretched, the resistors on the top edge of the basic z-serpentine are shorted as well because the edges of the top loop come together in contact, as shown as resistor model 136 of FIG. 16B. Thus, resistor model 136 may be described more simply as the resistor model 138 of FIG. 16B. As the sensor keeps stretching, the length of the top edge loops increase. Thus, the value of shorted resistance increases, while the value of the remaining resistors in series (e.g., the length of the crossing yarn in the middle of the stitch) decreases. The length of the bottom edge yarn has relatively small variation. Therefore it may remain unchanged during the stretching.

Figure 17:
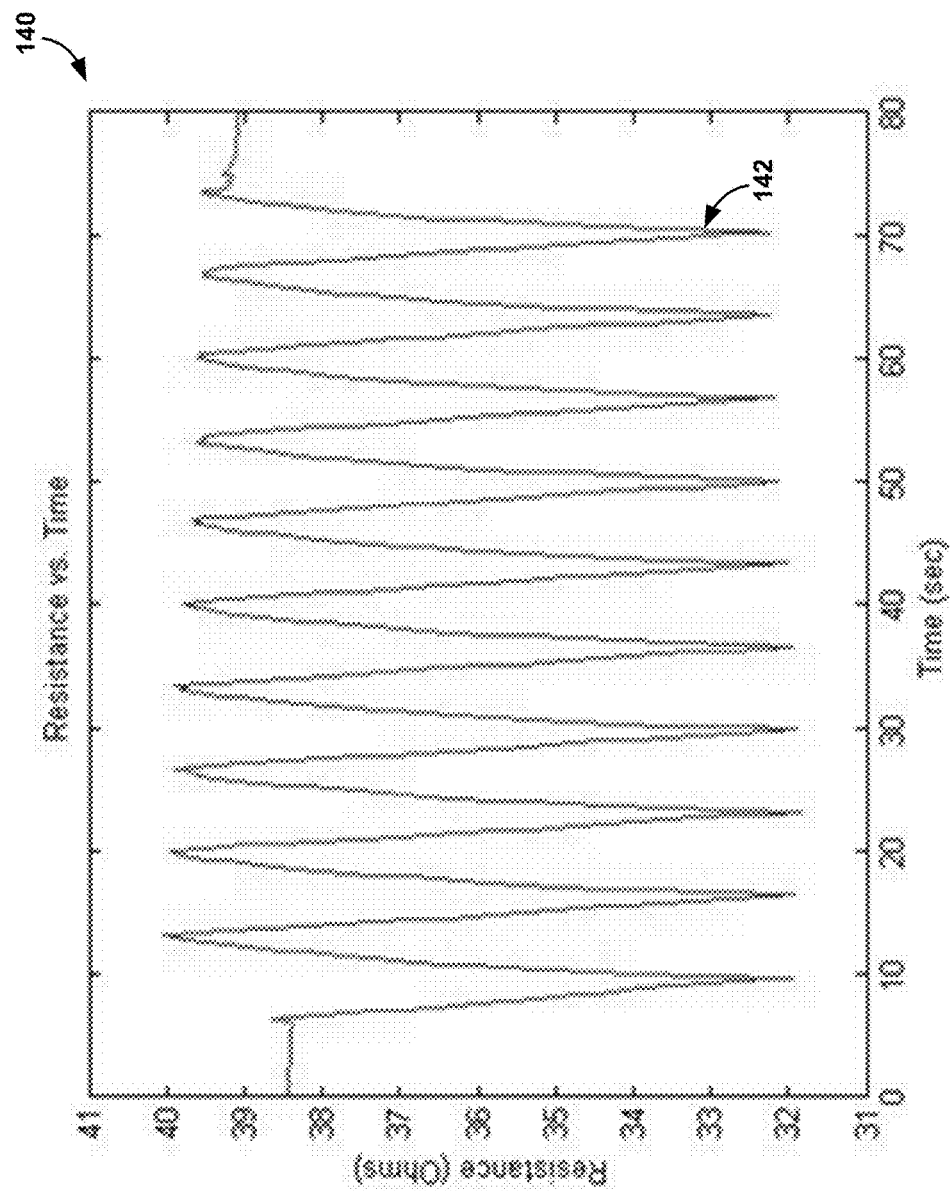
FIG. 17 is a graph showing test results of testing an example bottom-thread coverstitch stretch sensor.

FIGS. 16A and 16B illustrate bottom-thread coverstitch loops modeled as resistors (e.g., models 134 and 136), as described. In particular, FIG. 16A illustrates model 136 of the bottom-thread coverstitch loops when the sensor is relaxed, and FIG. 16B illustrates a model of the bottom-thread coverstitch loops when the sensor is stretched (e.g., models 136 and 138). FIG. 17 illustrates graph 140 of an output response 142 of a bottom-thread coverstitch stretch sensor for 10 repeated cycles of 25% stretch, starting and ending in a relaxed (no extension) position. Output response 142 is shown as resistance in Ohms over time, but the output of the sensor may be described in terms of other electrical properties in other examples.

As described herein, a stitched stretch sensor may be a type of stitched sensor configured to detect stretching and/or relaxing of a textile. In addition, a stitched sensor may be configured to detect bending of the textile (e.g., a stitched bend sensor). In some examples, a stitched stretch sensor may also be configured to detect bend. Bending of the stitched sensor may result in the stretch or compression of the sensor stitch (e.g., variations in the distance between loops or other sections of the conductive thread within the stitch structure). For example, the stitched sensor may be configured as a stitched bend sensor when a conductive thread is used as the bottom cover thread in the coverstitch (e.g., an ISO standard 406 or 602 coverstitch) described in FIG. 2 above. Other stitched sensors such as a bottom-thread coverstitch sensor or overedge stitched sensor may be configured as a stitched bend sensor in some examples. FIGS. 18 to 22 describe bend as it may be detected by a stitched bend sensor such as a sensor using the bottom cover thread in a coverstitch. A stitched sensor may be configured such as an electrical property of the stitched sensor changes based on at least one of outward bending, inward bending, and lateral bending of the stitched sensor stitched to a textile. In some cases, stretch of the sensor may incorporate some bend, and bend of a sensor may include some stretch of the sensor.

Figure 18:
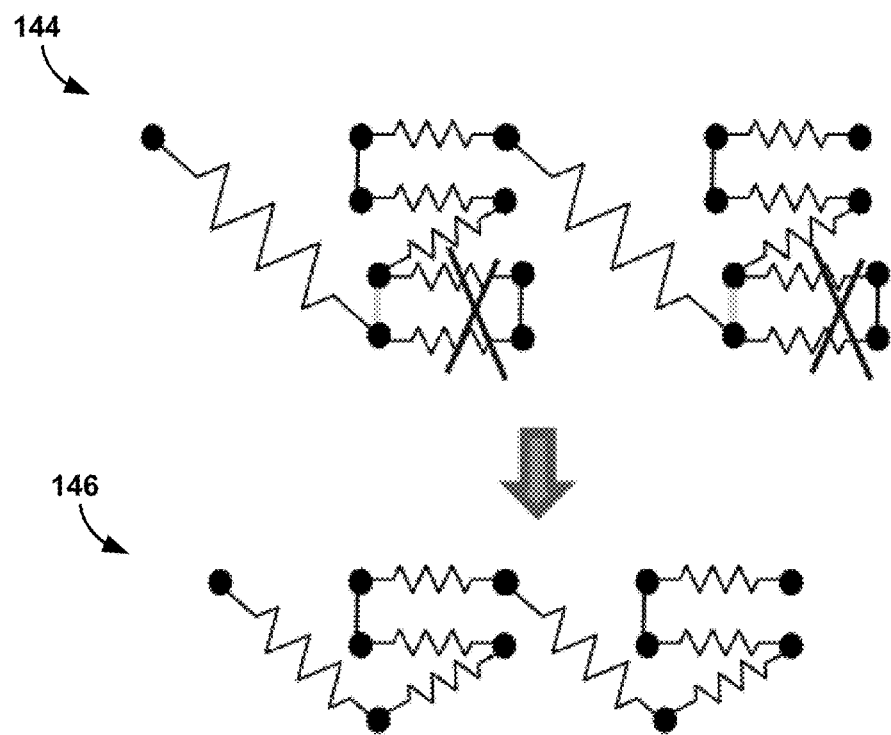
FIG. 18 is a schematic diagram illustrating equivalent example resistive circuits when an example bend sensor is relaxed and bent.

FIG. 18 is a schematic diagram illustrating equivalent example resistive circuits when a bend sensor is relaxed (resistive model 144) and bent (resistive model 146). As shown in FIG. 18, two different example configurations of a bottom cover thread in a coverstitch (such as the coverstitch of FIG. 2) are illustrated to indicate the changes in resistance due to bend of the bend sensor. The bottom cover thread loops in a coverstitch may be modeled as a series of basic z-shaped serpentine arrangements of resistors interconnected between each other by another resistor. Typically, the resistors on the bottom edge of the basic z-serpentine are partially shorted in the relaxed position (gray line of resistive model 144) because the conductive thread of the actual stitch overlaps. However, the contact between the two points on the conductive thread is weak in the relaxed position.

The yarn or thread used as the conductive thread may be made up of multiple filaments of conductive fiber twisted together. Due to this arrangement of conductive fiber, contact between fibers and between different points on the thread (e.g., different lengthwise locations of the thread) may be stronger or weaker depending on the forces holding the conductive fibers of the thread together. A stronger contact force may increase the electrical contact area of the thread and result in a decrease in resistance per unit length of the thread. When the stitched bend sensor is bent, the fibers making up the conductive portion of the stitch are pulled or pushed (depending upon the direction of the bend in relation to where the conductive thread of the stitch resides) into closer contact. This closer contact may improve the contact where loops of the conductive thread intersect. The bent configuration of the z-serpentine arrangement model (i.e., resistor model 146) in FIG. 18 illustrates the key points on the z-serpentine arrangement that are brought into closer contact when the sensor is bent, reducing the overall resistance of the conductive thread in the bend sensor. In other words, loops of the conductive thread in the stitch may overlap to improve contact between various portions of the thread to reduce overall resistance of the thread.

Figure 19:
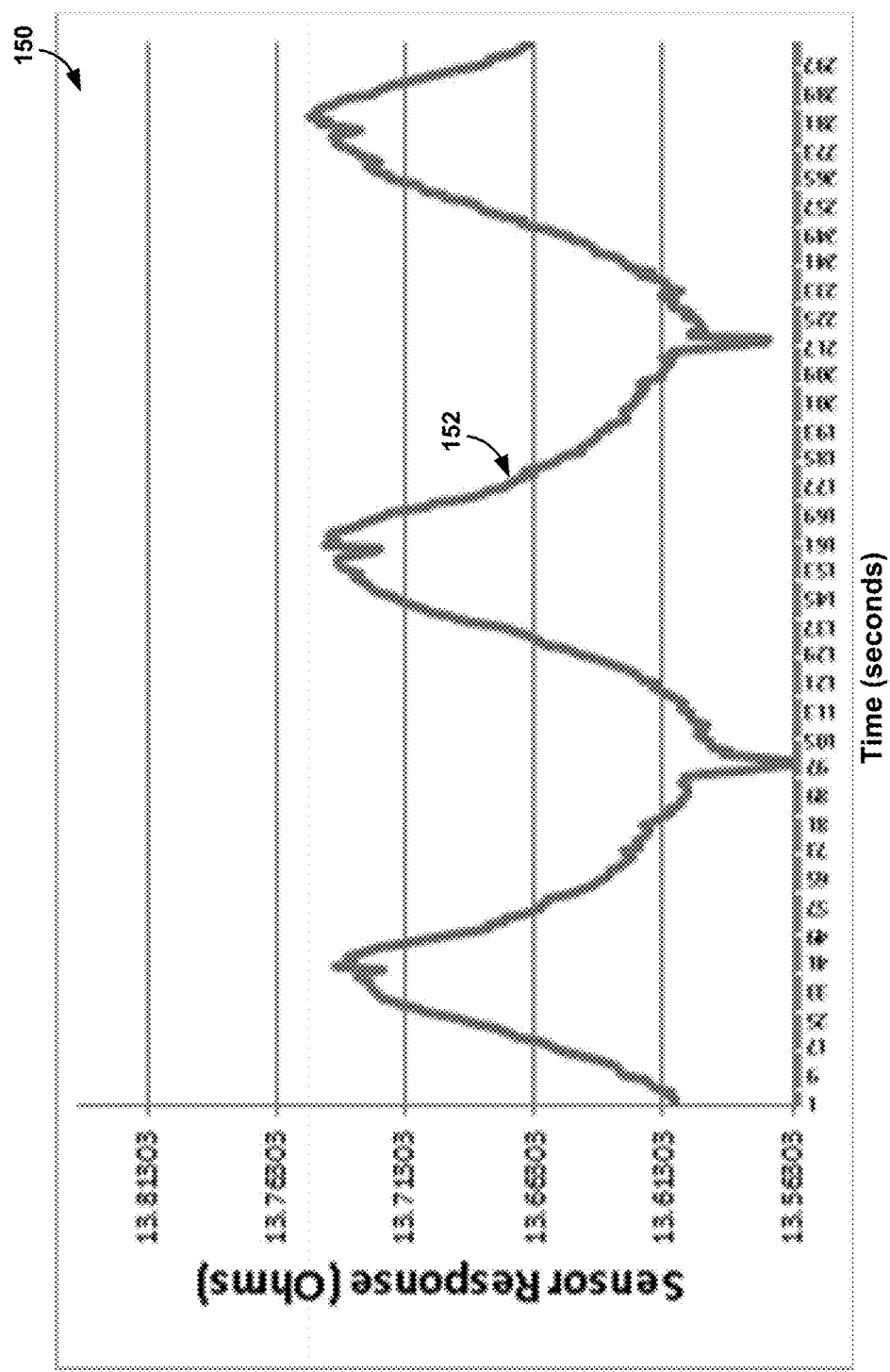
FIG. 19 is a graph showing test results of changes in resistance during bend for an example non-looped stitch structure.

FIG. 19 illustrates graph 150 showing test results of changes in resistance during bend for a non-looped stitch structure. As shown in FIG. 19, non-looped stitch structures, such as two-thread lockstitches, may exhibit a mild response to bending, shown as output response 152 in ohms. A non-looped structure may be described as a stitch structure in which there are no overlapping loop structures, in contrast to a coverstitch or other stitch geometries described herein.

FIG. 19 shows that a lockstitch response 152 to bending may provide a limited resistive change during bending, such as a resistive change of approximate one percent. This resistive change to bending may be much weaker than the resistive change, or sensor response, provided by a looped structure such as the coverstitch described herein. In this manner, the loops of a looping structure (e.g., a coverstitch) may provide more significant contributions to the detection of a bend in a stitched sensor (e.g., a more effective bend sensor).

Figure 20:
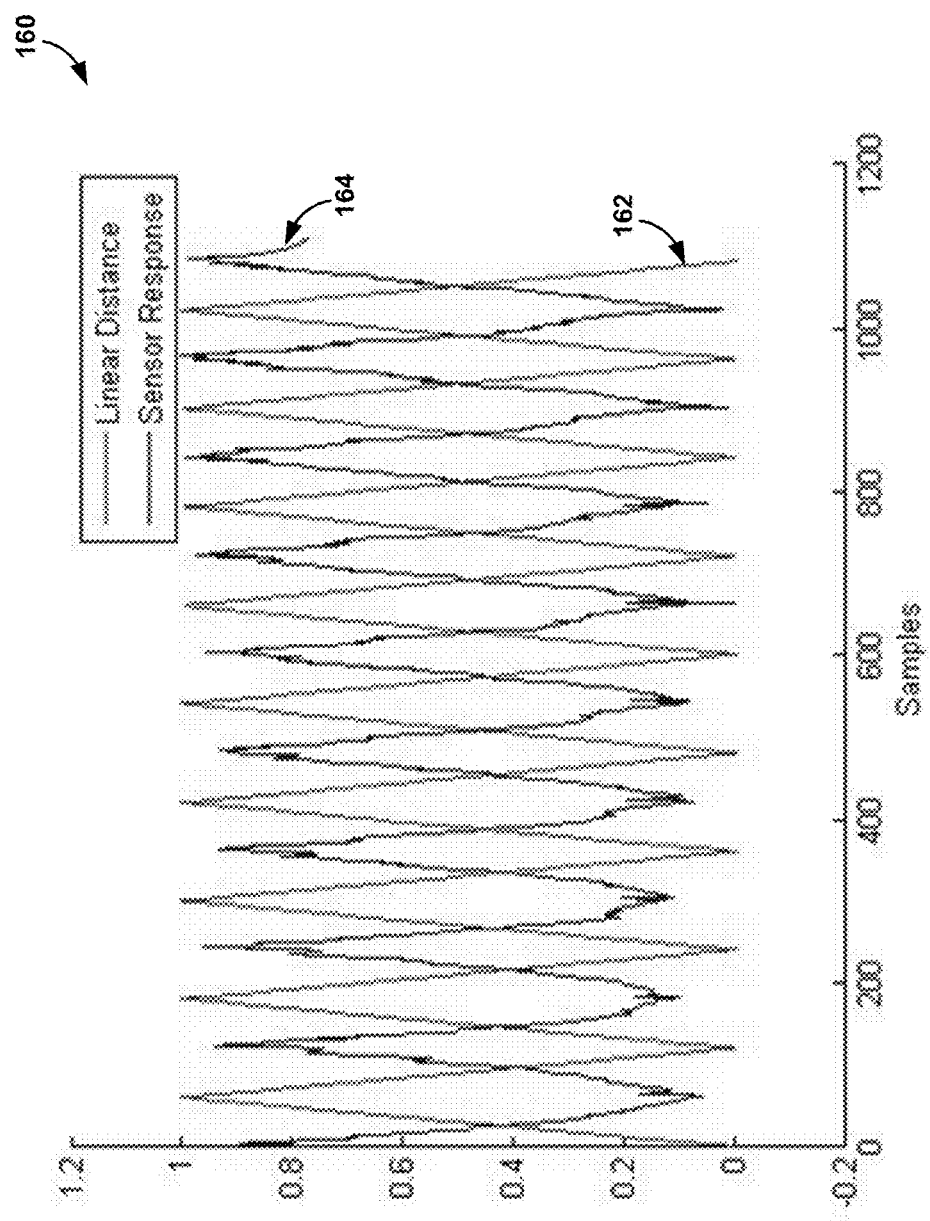
FIG. 20 is a graph showing example test results for an example bend sensor comparing bend away from the sensor stitch to changes in sensor resistance.
Figure 21:
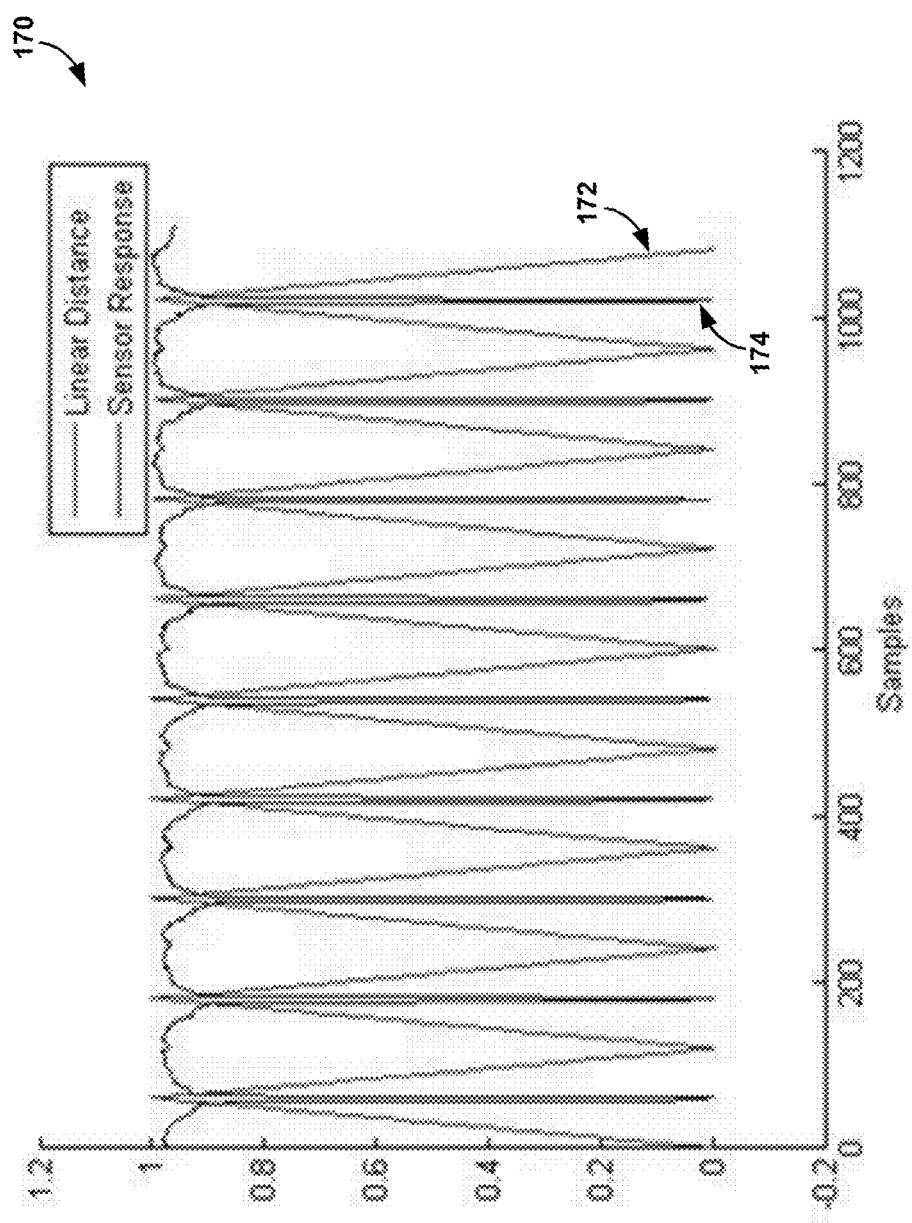
FIG. 21 is a graph showing example test results for an example bend sensor comparing bend in towards the sensor stitch to changes in sensor resistance.
Figure 22:
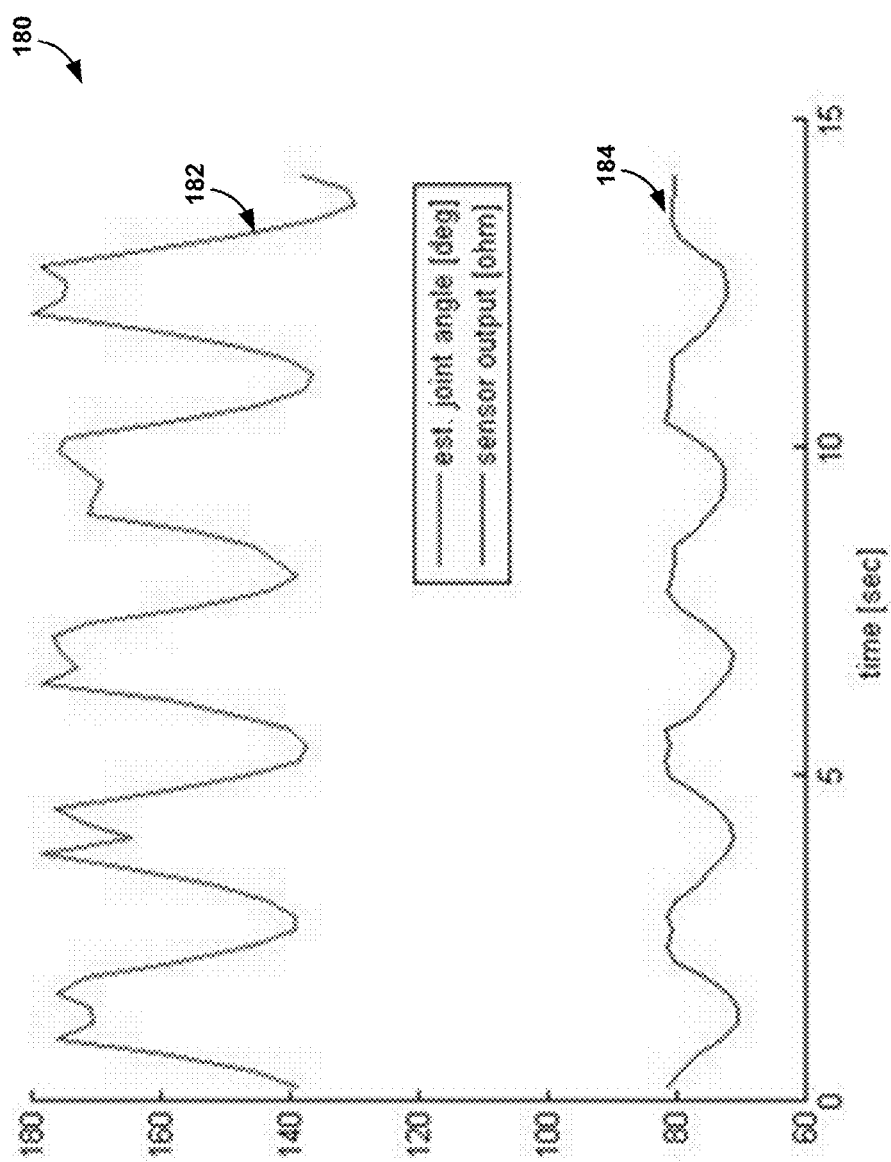
FIG. 22 is a graph showing example test results for an example bend sensor comparing lateral bend of the sensor stitch to changes in sensor resistance.

FIGS. 20, 21, and 22 indicate test results for a bend sensor using a coverstitch, such as the coverstitch of FIGS. 2 and 18. An ISO #602 coverstitch was used for the tests of FIGS. 20, 21, and 22. As shown, the sensor response, or change in resistance due to bend, is greater than for a non-looping stitch structure described in FIG. 19. FIG. 20 illustrates a graph 160 showing example test results for a bend sensor comparing bend away from the sensor stitch to changes in sensor resistance. The linear distance 162 bend away from the sensor is shown against the corresponding change in sensor response 164 (e.g., the sensor resistance) due to the bend. The sensor stitch may be the conductive thread portion of the bend sensor. Therefore, bend away from the sensor stitch may indicate that the conductive thread used as the bottom cover thread may be located on the outside of the bend.

As shown in FIG. 20, the linear distance 162 of the bend and the sensor response 164 (e.g., the detected resistance of the conductive thread) has been normalized for comparison purposes. As the bend sensor is bent in the direction away from the conductive thread, the sensor response 164, or resistance, decreases. Therefore, a decrease in resistance from the bend sensor may indicate a proportional increase in bend. The resistance of the bend sensor in FIG. 20 may be decreased approximately 15 percent from the resistance of the bend sensor in the relaxed or unbent configuration. This decrease in resistance may be used to identify outward bending of the bend sensor and the textile for which the bend sensor is attached.

FIG. 21 illustrates graph 170 showing example test results for a bend sensor comparing bend in towards the sensor stitch to changes in sensor resistance. Bend away from the sensor stitch may indicate that the conductive thread used as the bottom cover thread may be located on the inside of the bend. As shown in FIG. 21, the linear distance 172 of the bend and the sensor response 174 (e.g., the detected resistance of the conductive thread) has been normalized for comparison purposes. As the bend sensor is bent in the direction towards the conductive thread, the sensor response 174, or resistance, decreases. However, the resistance only decreases slightly with bend until a self-intersection occurs within the stitch. This self-intersection of the conductive thread of the sensor can create a large short across a large portion of the bend sensor and large decrease in resistance. Therefore, inward bend in the bend sensor may cause shorting behavior for self-intersecting folds. This shorting behavior may decrease resistance by as much as 70 percent of the resistance of the bend sensor in the relaxed or unbent configuration. This decrease in resistance may be used to identify inward bending of the bend sensor and the textile for which the bend sensor is attached.

FIG. 22 illustrates graph 180 showing example test results for a bend sensor comparing lateral bend of the sensor stitch to changes in sensor resistance. Lateral bend of the bend sensor may refer to a sideways bend of the conductive thread or a bend in the same plane as the loops of the conductive thread. The graph 180 of FIG. 22 indicates an estimated joint angle 182 of the bend sensor as the top trace and the bend sensor output 184 (or the resistance in ohms) as the bottom trace. The data provided in graph 180 of FIG. 22 was generated from a stitched sensor stitched on the outside of a pant leg at the knee of a human user when the knee was bent. In particular, the user moved between a standing position and a squat position.

As shown in FIG. 22, increases in the joint angle 182 of the bend sensor caused a corresponding decrease in resistance (e.g., approximately 80 ohms to 70 ohms) as indicated by sensor output 184. The sensor response to this lateral bending of the bend sensor was approximately a 12 percent decrease in resistance from the relaxed configuration. The sensor output 184 in FIG. 22 may also include resistances caused by unconstrained folding of the bend sensor and resulting self-intersection of the conductive thread during this folding. This decrease in resistance may be used to identify lateral bending of the bend sensor and the textile for which the bend sensor is attached.

Figure 23:
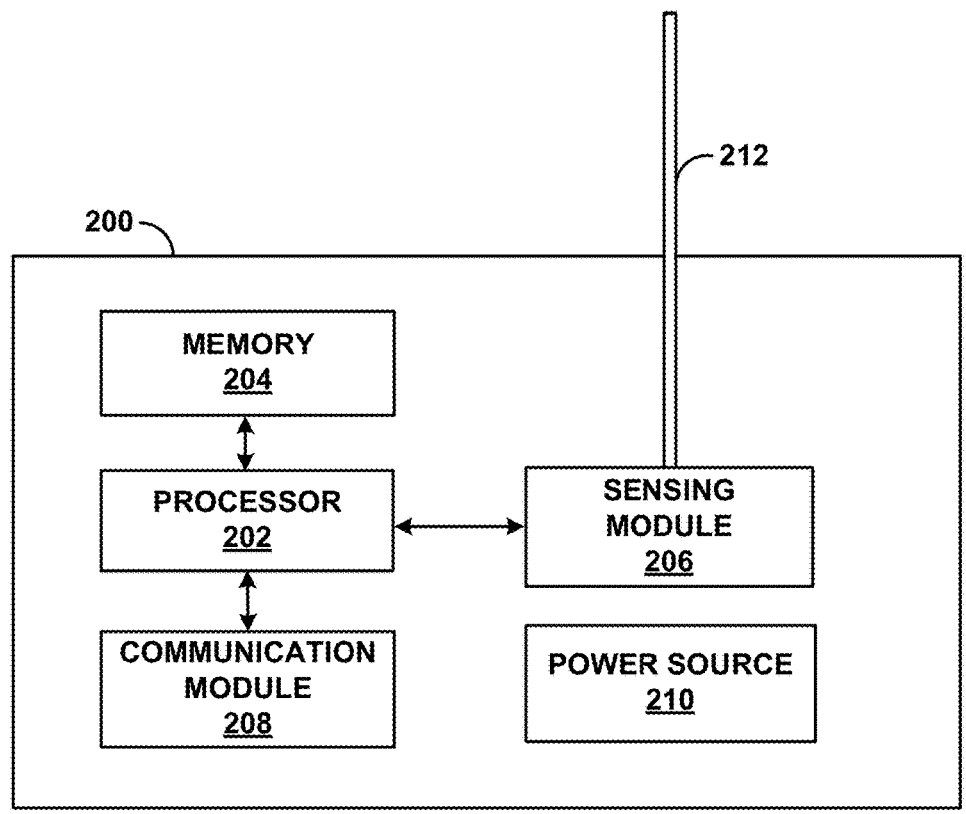
FIG. 23 is a functional block diagram of an example sensing unit in accordance with the disclosure.

FIG. 23 is a functional block diagram of an example sensing unit 200 in accordance with the disclosure. The example sensor unit 200 shown in FIG. 23 includes processor 202, memory 204, sensing module 206, communication module 208, and power source 210. Sensing module 206 may be coupled to stitched sensor 212 (e.g., a stitched stretch sensor or stitched bend sensor). Stitched sensor 212 (e.g., one or more conductive threads of the stitched sensor) may be permanently coupled to sensing module 206 via soldering, conductive adhesive, stitching, or any other attachment mechanism. Alternatively, stitched sensor 212 may be removably coupled to sensing module 206 via a coupling mechanism using a press-fit, set screw, latching, or other electrically conductive coupling mechanism. Although only one stitched sensor 212 is shown in FIG. 23, sensing unit 200 may be configured to sense stretch and/or bend from two or more different stitched sensors.

Processor 202 may include one or more processors and be configured to sense changes in an electrical property (e.g., resistance, impedance, current, or voltage) of stitched sensor 212 from deformations in the sensor 212. Processor 202 may control sensing module 206 to generate and output an electrical signal to stitched sensor 212 and sense the returning electrical signal from sensor 212. In one example, processor 202 is configured to run the software instructions in order to control operation of sensing unit 200. For example, the software instructions may define the generation of electrical signals, sensing of an electrical property, and/or calibration of the electrical property to a stretch and/or bend parameter. Processor 202 can include one or more processors, including one or more microprocessors, digital signal processors (DSPs), application specific integrated circuits (ASICs), field programmable gate arrays (FPGAs), or any other equivalent integrated or discrete logic circuitry, as well as any suitable combination of such components. The term "processor" or "processing circuitry" may generally refer to any of the foregoing logic circuitry, alone or in combination with other logic circuitry, or any other equivalent circuitry.

Memory 204 may include any volatile or non-volatile media, such as a random access memory (RAM), read only memory (ROM), non-volatile RAM (NVRAM), electrically erasable programmable ROM (EEPROM), flash memory, and the like. As mentioned above, memory 204 may store information including instructions for execution by processor 202 such as, but not limited to, instructions for generating electrical signals from sensing module 206 and sensing output from stitched sensor 212 and data related to the output of sensing module 206 from stitched sensor 212. Sensing module 206 may be controlled by processor 202.

Alternatively, sensing module 206 may include a dedicated processor and directly connect to memory 204. In other examples, sensing posture 206 may be integrated with processor 202 and/or memory 204.

Communication module 208 may provide one or more channels for receiving and/or transmitting information. Communication module 208 may be configured to perform wired and/or wireless communication with other devices, such as radio frequency communications. In other examples, communication module 208 may not be implemented, and instead, memory 204 may be removable (e.g., a removable flash memory).

Power source 210 delivers operating power to various components of sensing unit 200 Power source 210 may include a small rechargeable or non-rechargeable battery and a power generation circuit to produce the operating power. In some examples, power requirements may be small enough to allow sensing unit 200 to utilize patient motion and implement a kinetic energy-scavenging device to trickle charge a rechargeable battery part of power source 210. In other examples, non-rechargeable storage devices may be used for a limited period of time. As a further alternative, an inductive power supply could power sensing unit 200 whenever measurements are needed or desired.

Figure 24:
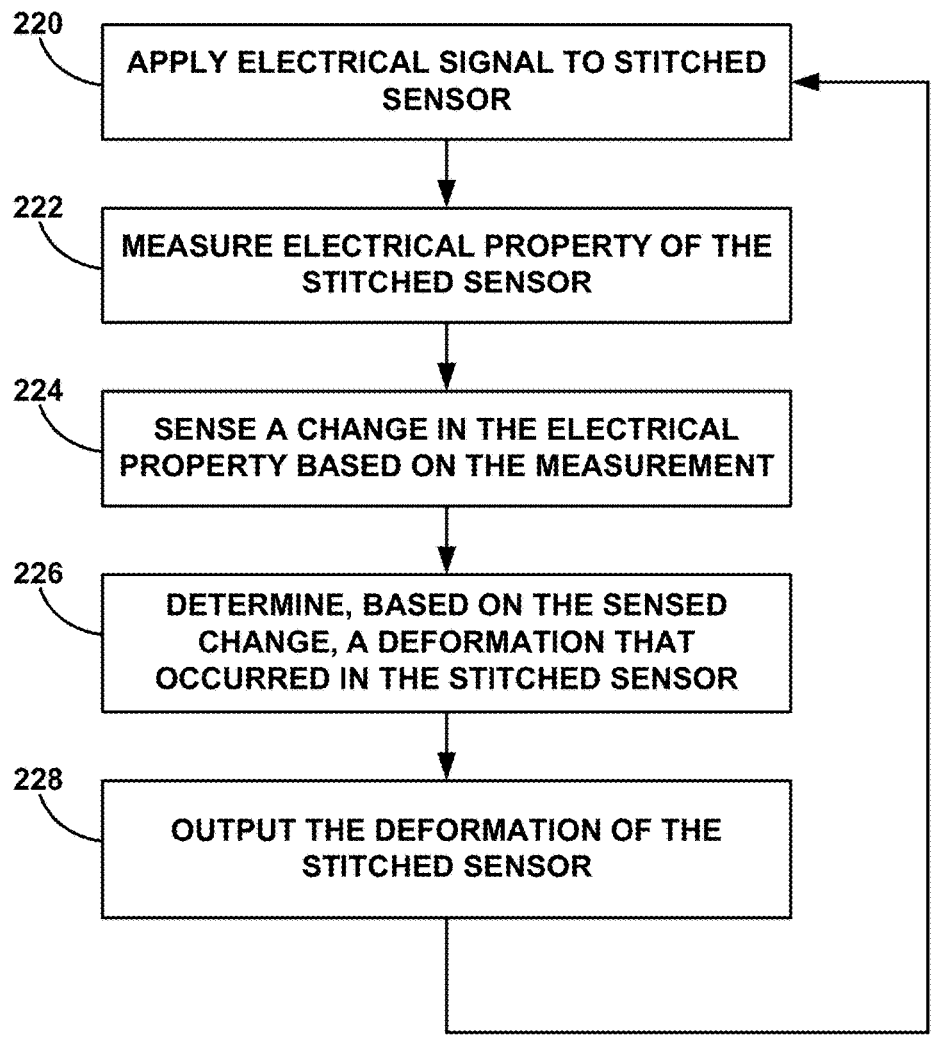
FIG. 24 is a flow diagram of an example process for sensing a conformation change in a textile.

FIG. 24 is a flow diagram of an example process for sensing a conformation change in a textile using a stitched sensor. The process of FIG. 24 will be described with respect to sensing unit 200 and stitched sensor 212, but any sensing unit and/or stitched sensor described herein may be used in other examples. As shown in FIG. 24, processor 202 controls sensing module 206 to apply an electrical signal to stitched sensor 212 (220). Based on a received signal from stitched sensor 212, sensing module 206 measures an electrical property of stitched sensor 212 (222), and processor 202 senses a change in the electrical property based on the measurement (234).

Processor 202 then determines, based on the sensed change, a deformation that occurred in the stitched sensor 212 (226). Based on stored instructions or calibration equations due to known deformation of stitched sensor 212 for a given change in the electrical property (e.g., resistance), processor 202 may be configured to determine the change in deformation (e.g., degree or magnitude of stretch, relaxation, and/or bending). Processor 202 may then output the determined deformation of stitched sensor 212 (228), for use in another calculation by processor 202, for storage in memory, and/or transmission to another device via communication module 208. In some examples, sensing module 212 may be configures to perform some or all of the processes of processor 202.

Although FIG. 24 describes a processor for determining the deformation of the stitched sensor, sensing unit 200 may not make that determination in other examples. For example, processor 202 may measure the electrical property ad output the measurement over time, such as a data recorder. In other examples, processor 202 may determine changes in the electrical property and store the changes without determining any deformation of the stitched sensor from the change. In other words, sensing unit 200 may be configured to perform minimal or complex calculations using the measured electrical property from the stitched sensor. In some example, sensing unit 200 may be integrated with the textile to which the stitched sensor is stitched. In other examples, sensing unit 200 may be removably coupled to the stitched sensor and/or the textile.

The disclosure contemplates computer-readable storage media comprising instructions to cause a processor to perform any of the functions and techniques described herein and/or any data that would be stored as described herein. The computer-readable storage media may take the example form of any volatile, non-volatile, magnetic, optical, or electrical media, such as a RAM, ROM, NVRAM, EEPROM, or flash memory that is tangible. The computer-readable storage media may be referred to as non-transitory. A sensing unit or other computing device may also contain a more portable removable memory type to enable easy data transfer or offline data analysis.

The techniques described in this disclosure, including those attributed to stitched sensors and/or sensing units 200, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in sensing units, remote servers, or other devices. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. For example, any of the techniques or processes described herein may be performed within one device or at least partially distributed amongst two or more devices, such as between processor 202 and sensing module 206. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Example computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or any other computer readable storage devices or tangible computer readable media. The computer-readable storage medium may also be referred to as storage devices.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A system comprising:
a stitched sensor comprising a plurality of threads stitched to a textile in a stitch geometry, the plurality of threads comprising a conductive thread defining a plurality of loops in the stitch geometry, wherein the stitch geometry is configured such that an electrical property of the stitched sensor changes based on respective locations at which one or more loops of the plurality of loops contact another portion of the conductive thread.

2. The system of claim 1, wherein at least some loops of the plurality of loops are configured to become closer together upon stretching of the textile and farther apart upon relaxation of the textile.

3. The system of claim 1, wherein the electrical property of the stitched sensor is a resistance of the stitched sensor.

4. The system of claim 3, wherein the stitched sensor is configured such that the resistance of the stitched sensor decreases in response to stretching of the textile.

5. The system of claim 1, wherein the electrical property of the stitched sensor is a resonance of the stitched sensor.

6. The system of claim 1, wherein the plurality of threads comprises the conductive thread and at least one non-conductive thread.

7. The system of claim 6, wherein:
the plurality of loops of the conductive thread comprise a first plurality of loops,
the at least one non-conductive thread defines a second plurality of loops in the stitch geometry, and
the first plurality of loops has an orientation approximately perpendicular to the second plurality of loops to form at least a portion of the stitch geometry.

8. The system of claim 1, wherein the stitch geometry comprises at least one of a coverstitch geometry, an overlock stitch geometry, or a lockstitch geometry.

9. The system of claim 1, further comprising the textile.

10. The system of claim 1, further comprising a sensing unit coupled to the conductive thread and configured to sense the change in the electrical property of the stitched sensor.

11. The system of claim 1, wherein at least some loops of the plurality of loops define a serpentine structure of the conductive thread.

12. The system of claim 1, wherein the stitch geometry comprises a coverstitch geometry, and wherein the conductive thread is a bottom-thread of the coverstitch geometry.

13. The system of claim 1, wherein the stitch geometry is configured such that the electrical property of the stitched sensor changes based on the respective locations at which the one or more loops of the plurality of loops contact another portion of the conductive thread due to bending of the stitched sensor.

14. A method comprising:
forming a stitched sensor by at least stitching a plurality of threads to a textile in a stitch geometry configured such that an electrical property of the stitched sensor changes based on respective locations at which one or more loops of a plurality of loops of a conductive thread contact another portion of the conductive threshold, the plurality of threads comprising a conductive thread defining the plurality of loops in the stitch geometry.

15. The method of claim 14, wherein stitching the plurality of threads to the textile in the stitch geometry comprises stitching the conductive thread such that the conductive thread defines a plurality of loops in the stitch geometry, and wherein the plurality of threads comprises the conductive thread and at least one non-conductive thread.

16. The method of claim 15, wherein stitching the plurality of threads to the garment in the stitch geometry comprises stitching the conductive thread such that at least some loops of the plurality of loops are configured to become closer together upon stretching of the textile and farther apart upon relaxation of the textile.

17. The method of claim 14, wherein the electrical property of the stitched sensor comprises a resistance of the stitched sensor, and wherein the resistance of the stitched sensor decreases in response to stretching of the textile.

18. The method of claim 14, wherein stitching the plurality of threads to the textile in the stitch geometry comprises stitching the plurality of threads in at least one of a coverstitch geometry, an overlock stitch geometry, or a lockstitch geometry.

19. The method of claim 14, wherein stitching the plurality of threads to the textile in the stitch geometry comprises stitching the plurality of threads in a coverstitch geometry, and wherein the conductive thread is a bottom-thread of the coverstitch geometry.

20. The method of claim 14, wherein stitching the plurality of threads to the textile in the stitch geometry comprises stitching the conductive thread such that the electrical property of the stitched sensor changes based on the respective locations at which the one or more loops of the plurality of loops contact another portion of the conductive thread due to bending of the stitched sensor.

21. A system comprising:
a plurality of threads stitched to a textile in a stitch geometry, the plurality of threads comprising a conductive thread and one or more non-conductive threads, wherein the stitch geometry is configured such that an electrical property of the conductive thread changes based on respective locations at which one or more loops of the plurality of loops contact another portion of the conductive thread; and
a sensing unit electrically coupled to the conductive thread in the stitch geometry and configured to sense the change in the electrical property of the conductive thread.

* * * * *